(12) United States Patent
Kerfoot

(10) Patent No.: US 8,906,241 B2
(45) Date of Patent: Dec. 9, 2014

(54) ENHANCED REACTIVE OZONE

(75) Inventor: William B. Kerfoot, Falmouth, MA (US)

(73) Assignee: Kerfoot Technologies, Inc., Mashpee, MA (US)

( * ) Notice: Subject to any disclaimer, the term of this patent is extended or adjusted under 35 U.S.C. 154(b) by 16 days.

(21) Appl. No.: 11/516,973

(22) Filed: Sep. 7, 2006

(65) Prior Publication Data

US 2008/0061006 A1    Mar. 13, 2008

(51) Int. Cl.
*C02F 1/78* (2006.01)
*B82Y 30/00* (2011.01)
*C02F 103/06* (2006.01)
*C02F 101/32* (2006.01)

(52) U.S. Cl.
CPC .............. *C02F 1/78* (2013.01); *C02F 2305/08* (2013.01); *C02F 2201/784* (2013.01); *C02F 2103/06* (2013.01); *C02F 2303/26* (2013.01); *C02F 2201/782* (2013.01); *B82Y 30/00* (2013.01); *C02F 2101/322* (2013.01)
USPC ......... 210/747.8; 210/759; 210/760; 210/192

(58) Field of Classification Search
CPC .. C02F 1/78; C02F 2101/322; C02F 2305/08; C02F 2201/782; C02F 2201/784; C02F 2303/26; C02F 2103/06; B82Y 30/00; B82Y 40/00
USPC .............. 210/747, 749, 758, 759, 760, 192, 210/198.1, 747.7, 747.8; 204/176
See application file for complete search history.

(56) References Cited

U.S. PATENT DOCUMENTS

| | | | |
|---|---|---|---|
| 4,639,314 A | 1/1987 | Tyer | |
| 4,696,739 A | 9/1987 | Pedneault | |
| 4,966,717 A | 10/1990 | Kern | |
| 5,116,163 A | 5/1992 | Bernhardt | |
| 5,122,165 A | 6/1992 | Wang et al. | |
| 5,180,503 A | 1/1993 | Gorelick et al. | |
| 5,221,159 A | 6/1993 | Billings et al. | |
| 5,227,184 A | 7/1993 | Hurst | |
| 5,246,309 A | 9/1993 | Hobby | |
| 5,277,518 A | 1/1994 | Billings et al. | |
| 5,389,267 A | 2/1995 | Gorelick et al. | |
| 5,425,598 A | 6/1995 | Pennington | |
| 5,451,320 A | 9/1995 | Wang et al. | |
| 5,472,294 A | 12/1995 | Billings et al. | |
| 5,698,092 A | 12/1997 | Chen | |
| 5,851,407 A | 12/1998 | Bowman et al. | |
| 5,879,108 A | 3/1999 | Haddad | |

(Continued)

FOREIGN PATENT DOCUMENTS

| | | |
|---|---|---|
| JP | 4-171036 | 6/1992 |
| JP | 6-023378 | 2/1994 |

OTHER PUBLICATIONS

AIST: Development of Nanobuble Manufacturing/Stabilization Technology and its Applications, Annual report 2003-2004.*

(Continued)

*Primary Examiner* — Lucas Stelling
(74) *Attorney, Agent, or Firm* — Fish & Richardson P.C.

(57) ABSTRACT

Disclosed is a new form of reactive ozone and techniques for producing nanobubble suspensions of the reactive ozone. The bubbles entrap a high concentration of ozone, with the ozone orienting a net negative charge outwards and a net positive charge inwards.

15 Claims, 12 Drawing Sheets

(56) References Cited

U.S. PATENT DOCUMENTS

| | | | |
|---|---|---|---|
| 6,007,274 | A | 12/1999 | Suthersan |
| 6,217,767 | B1 | 4/2001 | Clark |
| 6,235,206 | B1* | 5/2001 | Chan et al. .................... 210/739 |
| 6,283,674 | B1 | 9/2001 | Suthersan |
| 6,391,259 | B1 | 5/2002 | Malkin et al. |
| 6,403,034 | B1 | 6/2002 | Nelson et al. |
| 6,582,611 | B1* | 6/2003 | Kerfoot ......................... 210/747 |
| 2001/0007314 | A1* | 7/2001 | Sherman ....................... 210/760 |
| 2005/0077249 | A1* | 4/2005 | Kerfoot ......................... 210/760 |
| 2007/0205161 | A1* | 9/2007 | Chiba et al. ................... 210/748 |

OTHER PUBLICATIONS

Cameron, "In Case You Missed It: Tiny Bubbles," Jun. 2005, ACCJ Journal.*

"Factors Controlling the Removal of Organic Pollutants in an Ozone Reactor", M.D. Gurol, AWWA 1984 Annual Conference, Dallas, TX, Jun. 10-14, 1984, pp. 2-21.

"In-situ Air Sparging Without Inorganic Nutrient Amendment: An Effective Bioremediation Strategy for Treating Petroleum-Contaminated Groundwater Systems", R. Schaffner, Jr., et al., http://www.bioremediationgroup.org/BioReferences/Tier1Papers/insitu.htm, Jul. 30, 2003, pp. 1-14.

"Environmental Management", DON Environmental Restoration Plan for Fiscal Years 1997-2001, Sep. 30, 1996, pp. 4-1 to 4-8.

"How to Evaluate Alternative Cleanup Technologies for Underground Storage Tank Sites", *U.S. Environmental Protection Agency*, Oct. 1994.

"Yuma Pilot-Testing Ozone Sparging, Stripping", *Pasha Publications, Defense Cleanup*, Nov. 8, 1996, pp. 5-6.

"Chemical Degradation of Aldicarb in Water Using Ozone", F.J. Beltran et al., *Journal of Chemical Technology & Biotechnology*, 1995, pp. 272-278.

"Modelling Industrial Wastewater Ozonation in Bubble Contactors", *Ozone Science & Engineering*, vol. 17, 1995, pp. 379-398.

"Modelling Industrial Wastewater Ozonation in Bubble Contactors", *Ozone Science & Engineering*, vol. 17, 1995, pp. 355-378.

"Kinetics of the Bentazone Herbicide Ozonation ", *Journal of Environmental Science and Health*, vol. A31, No. 3, 1996, pp. 519-537.

"Field Applications of In Situ Remediation Technologies: Chemical Oxidation", *U.S. Environmental Protection Agency*, Sep. 1998, pp. 1-31.

"Technology Status Review in Situ Oxidation", *Environmental Security Technology Certification Program*, Nov. 1999, pp. 1-42.

Design of a Packed Bed Ozonation Reactor for Removal of Contaminants from Water, Billing, *Dissertation Abstracts International*, vol. 57, No. 10, Apr. 1997, pp. 6398-B.

"Completed North American Innovative Remediation Technology Demonstration Projects", *U.S. Environmental Protection Agency, Office of Solid Waste and Emergency Response*, Aug. 12, 1996, pp. 1-35.

"Ground Water Issue", H.H. Russell et al., *U.S. Environmental Protection Agency*, Jan. 1992, pp. 1-10.

"In Situ Chemical Treatment", Y. Yin, Ph.D., *Technology Evaluation Report, GWRTAC*, Jul. 1999, pp. 1-74.

"Analysis of Selected Enhancements for Soil Vapor Extraction", U.S. Environmental Protection Agency, Sep. 1997, pp. 1-5 to 7-39.

Biologisch-chemische Behandlung Eines Kontaminierten Grundwassers von einem Gaswerksgelande, Dr.-Ing. Joachim Behrendt, *Technische Universitat Hamburg-Harburg, Germany*, vol. 136, No. 1, Jan. 1995, pp. 18-24.

"Single-phase Membrane Ozonation of Hazardous Organic Compounds in Aqueous Streams", P.V. Shanbhag et al., *Journal of Hazardous Materials* 41, 1995, pp. 95-104.

Gas Partitioning of Dissolved Volatile Organic Compounds in the Vadose Zone: Principles, Temperature Effects and Literature Review, J.W. Washington, Groundwater, vol. 34, No. 4, Jul.-Aug. 1996, pp. 709-718.

"Biologically Resistant Contaminants, Primary Treatment with Ozone", D.F. Echegaray et al., *Water Science and Technology, A Journal of the International Association on Water Quality*, vol. 29, No. 8, 1994, pp. 257-261.

"Toxins, toxins everywhere", K.K. Wiegner, *Forbes*, Jul. 22, 1991, pp. 298.

"In Situ Air Sparging System", *Tech Data Sheet, Naval Facilities Engineering Service Center*, Mar. 1997, pp. 1-4.

"Ground Water, Surface Water, and Leachate", http://www.frtr.gov/matrix2/section_4/4-30.html, Jul. 22, 2003, pp. 1-4.

"Alternate Technologies for Wastewater Treatment", J. Hauck et al., *Pollution Engineering*, May 1990, pp. 81-84.

"Cleaning up", *Forbes*, Jun. 1, 1987, pp. 52-53.

"In Situ Chemical Oxidation for Remediation of Contaminated Soil and Ground Water", *EPA*, Sep. 2000, Issue No. 37, pp. 1-6.

"Aquifer Remediation Wells", *EPA*, vol. 16, Sep. 1999, pp. 1-80.

"Transfer Rate of Ozone across the Gas-Water Interface", S. Okouchi et al., The Chemical Society of Japan, No. 2, 1989, pp. 282-287.

"Effect of Organic Substances on Mass Transfer in Bubble Aeration", M. Gurol et al., *Journal WPCF*, vol. 57, No. 3, pp. 235-240.

"Clare Water Supply", *EPA*, http://www.epa.gov/region5/superfund/npl/michigan/MID980002273.htm, pp. 1-3.

"Who's Afraid of MTBE?", K.P. Wheeler et al., *Manko, Gold & Katcher*, http://www.rcc-net.com/Wheels.htm, Jul. 2000, pp. 1-5.

"RCC RemedOzone Mobile Remediation System", RCC.

"Santa Barbara I Manufactured Gas Plant Site", *California EPA*, Jan. 2002, pp. 1-6.

"Typical Applications of Ozone", ARCE Systems, Inc., http://www.arcesystems.com/products/ozone/applications.htm, Feb. 2000, pp. 1-2.

"Strategies to Protect Your Water Supply from MTBE", Komex Industries, http://www.komex.com/industries/remediation.stm, 2002, pp. 1-8.

"In Situ Remediation with Chemical Oxidizers: Ozone, Peroxide and Permanganate", Environmental Bio-systems, Inc., pp. 1-5.

"Newark Brownfield Site to Increase Student Housing", Environmental Alliance Monitor, http://www.envalliance.com/monitor&pubs/1998fall.htm, 1998, pp. 1-8.

"In Situ Ozonation to Remediate Recalcitrant Organic Contamination", J. Dablow et al., IT Corporation, pp. 1-2.

"Ozone Design Considerations for Water Treatment", R.C. Renner et al., Presented at AWWA Rocky Mountain Section Meeting in Keystone, CO., Sep. 16-19, 1984, pp. 103-121.

"Ozone Treatment at Monroe, Michigan", W. L. LePage, Second International Symposium on Ozone Technology, May 11-14, 1975, pp. 198-210.

"Ozone Mass Transfer and Contact Systems", W. S. Sease, Second International Symposim on Ozone Technology, May 11-14, 1975, pp. 1-14.

"Design of an Ozonation System for a Wastewater Treatment Facility—A Case History", Jain S. Jain et al., First International Symposium on Ozone for Water & Wastewater Treatment, Dec. 2-5, 1973, pp. 852-877.

"Mass Transfer in a Gas Sparged Ozone Reactor", A.G. Hill et al., First International Symposium on Ozone for Water & Wastewater Treatment, Dec. 2-5, 1973, pp. 367-380.

"Ozone Contacting Systems", Dr. D.E. Stahl, First International Symposium on Ozone for Water & Wastewater Treatment, Dec. 2-5, 1973, pp. 40-55.

"Handbook of Ozone Technology and Applications", Rip G. Rice et al., vol. 1, 1982, Ann Arbor Science, 2 pages.

"Ozonization Manual for Water and Wastewater Treatment", Dr. W.J. Masschelein, Wiley-Interscience Publication, 1982, pp. 1, 48-53.

"Ozonization Manual for Water and Wastewater Treatment", Dr. W.J. Masschelein, Wiley-Interscience Publication, 1982, pp. 136-139.

"Ozonization Manual for Water and Wastewater Treatment", Dr. W.J. Masschelein, Wiley-Interscience Publication, 1982, pp. 300-305.

"Ozonization Manual for Water and Wastewater Treatment", Dr. W.J. Masschelein, Wiley-Interscience Publication, 1982, pp. 306-309.

"Ozone in Water Treatment, Application and Engineering", B. Langlais et al., American Water Works Association Research Foundation, 1991, p. 389.

(56) References Cited

OTHER PUBLICATIONS

"Analytical Aspects of Ozone Treatment of Water and Wastewater", Rip G. Rice et al., Lewis Publishers, Inc., 1986, p. 13.

"Ozone in Water and Wastewater Treatment", F.L. Evans III et al., Ann Arbor Science Publishers Inc., 1982, *Chapter VIII, Practical Aspects of Water and Waste Water Treatment by Ozone, E.W.J. Diaper*, pp. 145-179.

"Sonolytic Decomposition of Ozone in Aqueous Solution: Mass Transfer Effects", Weavers et al., *Environmental Science Technology*, 1998, 32, pp. 3941-3947.

"A Theoretical Model for Bubble Formation at a Frit Surface in a Shear Field", Johnson et al., *Separation Science and Technology*, 17(8), pp. 1027-1039, 1982.

"Analysis of Organic Pollutants of Water and Wastewater", W. Leithe, Dec. 1972, *Ozone in Water and Wastewater Treatment*, EPA, pp. 28-59.

"In Situ Chemical Oxidation", Kelley et al., *MTBE Remediation Handbook-Section II*, pp. 223-241.

"Ozone Nanobubble Treatment of Complex Organics", W.B. Kerfoot, Presented at *International Ozone Association*, Pan American Group, IOA-PAG Congress, Aug. 2008, Orlando, FL.

"Coated Nanobubble Ozone Generator Systems for Inline Disinfection and VOC Removal", W.B. Kerfoot, Presented at *International Ozone Association*, Pan American Group Annual Conference, 2010, Seattle, WA.

"Technical Summary of Oil & Gas Produced Water Treatment Technologies", Arthur et al., All Consulting, Mar. 2005, pp. 1-53.

"Ozone in Drinking Water Treatment", Rakness, *American Water Works Association Science and Technology*, First Edition, pp. 16-75.

"Application of Ozone Nano-bubble for Pesticide Removal", Chan et al., Presented at *International Ozone Association*, World Congress on Ozone and Ultraviolet Technologies, Los Angeles, CA, 2007.

\* cited by examiner

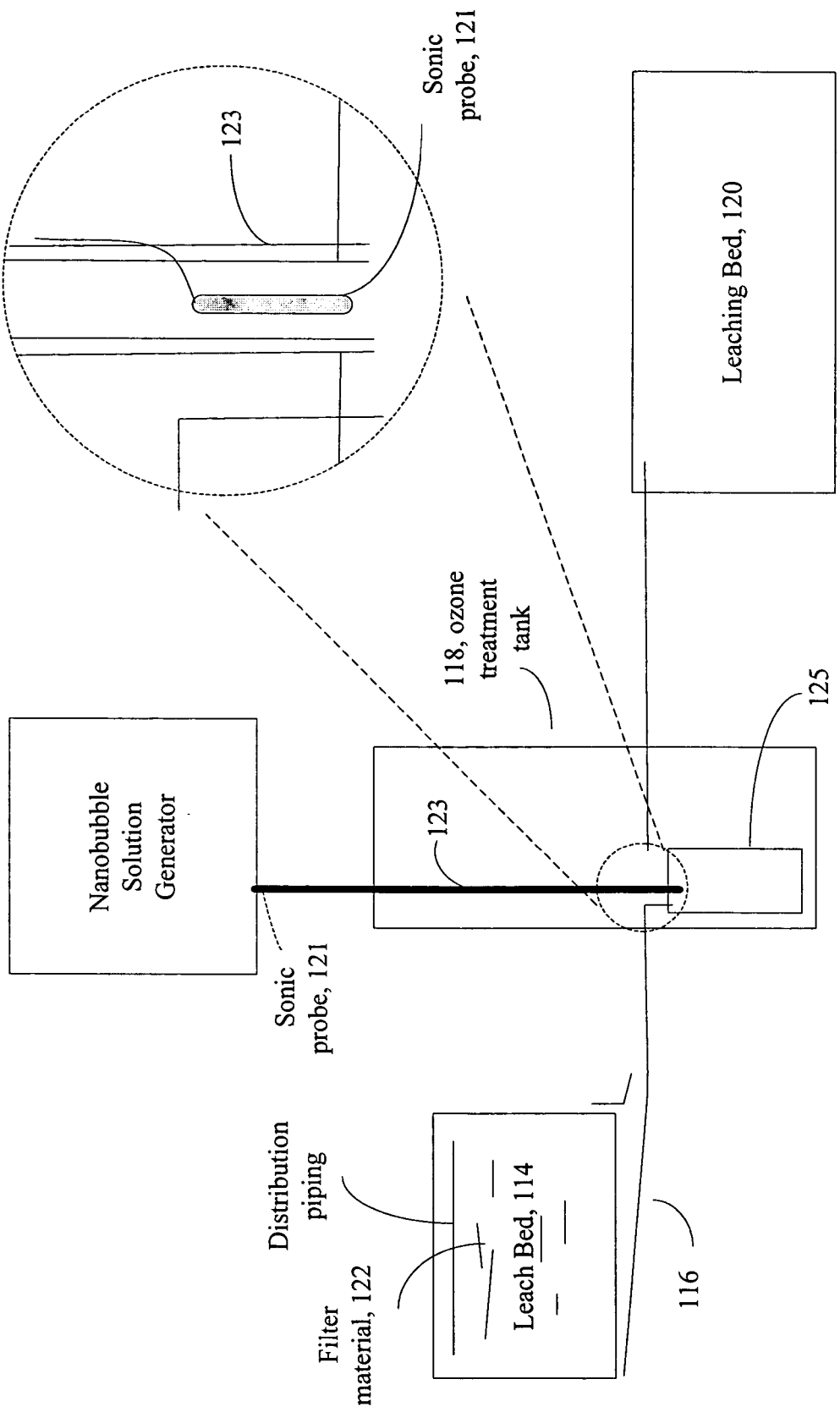

ENHANCED REACTIVE OZONE

BACKGROUND

There is a well-recognized need to clean-up contaminants that exist in ground water, i.e., aquifers and surrounding soil formations. Such aquifers and surrounding soil formations may be contaminated with various constituents including organic compounds such as, volatile hydrocarbons, including chlorinated hydrocarbons such as trichloroethene (TCE), and tetrachloroethene (PCE). Other contaminates that can be present include vinyl chloride, 1,1,1 trichloroethane (TCA), and very soluble gasoline additives such as methyltertiarybutylether (MTBE). Other contaminants may also be encountered.

Ozone sparging is now widely recognized as being one of the more effective oxidation techniques for destroying contaminants that exist in groundwater.

Other types of contaminants are more recalcitrant. For instance, pharmaceuticals are particularly resistant to decomposition from known techniques including ozone sparging. Pharmaceuticals enter the groundwater from various sources. One source is pharmaceutical laboratories and manufacturing plants located in area with septic systems for waste disposal. Other sources are hospitals and nursing homes.

Pharmaceutical residuals are increasingly found in sewage discharges. Stronger selective oxidation techniques are necessary to the discharge of antibiotic-resistant bacteria and pharmaceutical residuals into groundwater and surface waters. Zwiener and Frimmel "Oxidative Treatment Of Pharmaceuticals In Water" Water Research 34(6) 1881-1885 (2000); Andreozzi et al. "Paracetanol Oxidation From Aqueous Solutions By Means Of Ozonation and $H_2O_2$ UV System" Water Research 37 993-1004 (2003), and Huber et al. "Oxidation Of Pharmaceuticals During Ozonation And Advanced Oxidation Processes" Environmental Science and Technology (2003) have proposed that oxidation systems need to be improved to address the variety of compounds involved. Korhonen et al. Oxidation of Selected Pharmaceuticals in Drinking Water Treatment, Presented at the ninth International Conference on Advanced Oxidation Technologies for Water and Air Remediation Canada (2003) felt that ozone or a combination of ozone and peroxide may offer effective treatment. The identified pharmaceutical residuals include the lipid regulator bezafibrate, antiepileptic carbamazepine, analgesic/inflammatory diclofenac and ibuprofen, and the antibiotic sulfamethoxazole. Even though Korhonen et al. (2003) obtained 90% removal of bezafibrate with ozone alone, H2O2 (peroxide) additional was necessary to obtain over 90% removal of carbamazepine, ibuprofen, and bezafibrate in clean water samples. However, with sewage, the presence of natural organic material (NOM) inhibits effective reaction.

Another need improved oxidation systems comes from treatment of alkanes and alkenes, common to petroleum products and spills. The bulk of petroleum products are aliphatic long-chain compounds, which are often 75% of the product. In heavier refined products, the carbon chain notation for molecular size, $C_5$ to $C_{30}$ denotes the dominant molecular fractions from 5-carbon to 30-carbon atoms strung together in a single chain. The higher fractions, particularly when branched, are resistant to bacterial action. Fogel (2001) has found that well-aerated samples of petroleum from a diesel source, even when supplied optimal nutrients, will leave about 25% undigested.

SUMMARY

Ozone has shown a high affinity to attack the alkane fractions. In laboratory testing and field trials, as the ozone concentration has been increased and the size of microbubbles decreased to below micron levels, the efficiency of reactivity has increased to the level beginning to exceed the normal ratio of 1 to 3 molar, or ⅓ of the ozone molecules being involved, common to normal ozone molecular reactions where only the terminal oxygen inserts. It has been thought that secondary biological (bacterial) reactions may be responsible for the ratio approaching 1 to 1 on a mass to mass basis. However, I now believe that there is sufficient basis from laboratory tests to define a newer reactive form of ozone which has become apparent as the bubble size moves from micron size to nano size diameters.

This may prove particularly capable of removing petroleum chain products and to treat sewage effluent since the long-chain fatty products are known as the common clogger of leaching fields.

According to an aspect of this invention, the invention provides a new form of reactive ozone and techniques for producing nanobubble suspensions.

According to a further aspect of this invention, a method includes a method includes forming bubbles having a submicron radius, the bubbles entrapping a high concentration of ozone, with the ozone orienting a net negative charge outwards and a net positive charge inwards.

According to a further aspect of this invention, a method, includes delivering ozone gas to a diffuser that emits bubbles having a diameter substantially less that 1 micron and selecting conditions under which the ozone gas emanates from the diffuser, entrapped as a gas in the bubbles and having an orientation of negative charge on the surface of the bubbles.

According to a further aspect of this invention, a method includes a diffuser including a casing, a bubble generator disposed in the casing and a stirrer disposed at an egress of the casing.

According to a further aspect of this invention, a panel includes an ozone generator, a controller, a metering gas generator/compressor, and a nano bubble solution generator.

According to a further aspect of this invention, a discharge tube is fed by a nano bubble solution generator in which is disposed an acoustic probe at the end for dissemination of the reactive liquid.

One or more advantages can be provided from the above.

The treatment techniques can use bubbles, bubbles with coatings, and directed sound waves to treat volatile organic compounds (VOCs), pharmaceuticals, and other recalcitrant compounds found in drinking water, ground water, sewage, and chemical waste waters. Nano scale reactions should allow a three to tenfold increase in efficiency of reactions which will significantly improve treatment, e.g., reduction of residence contact time, reduction of column height for treatment, etc.

The new, reactive form of ozone is manifest as a nanoscale film. The arrangements combine new reactive ozone species with dissolved ozone, suspended with nanoscale gaseous ozone. Sonic vibration can be used to restructure the ozone bubbles to allow for sonic vibration of the nanoscale spherical film surfaces to further increase selectivity and reactivity. The addition of coatings of peroxides further enhances reactive radical production of hydroxyl and perhydroxyl species further improving reaction rates.

With an ex-situ system, the generation of suspended homogenized micro to nanoscale-sized ozone bubble solutions allowing the flow of the reactive liquid into a treatment container (ozone tank or sump) without concern for fouling of a membrane or microporous surface during gas generation. The generator can be supplied with filtered tap water (normally available with 50 psi pressure), an ozone generator, and small pump with house current (120V) and housed in a simple container for application.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6A is a schematic, elevational view of the septic system of FIG. 6.

FIG. 6B is a blown up view of a portion of FIG. 6A.

DETAILED DESCRIPTION

Figure 1:
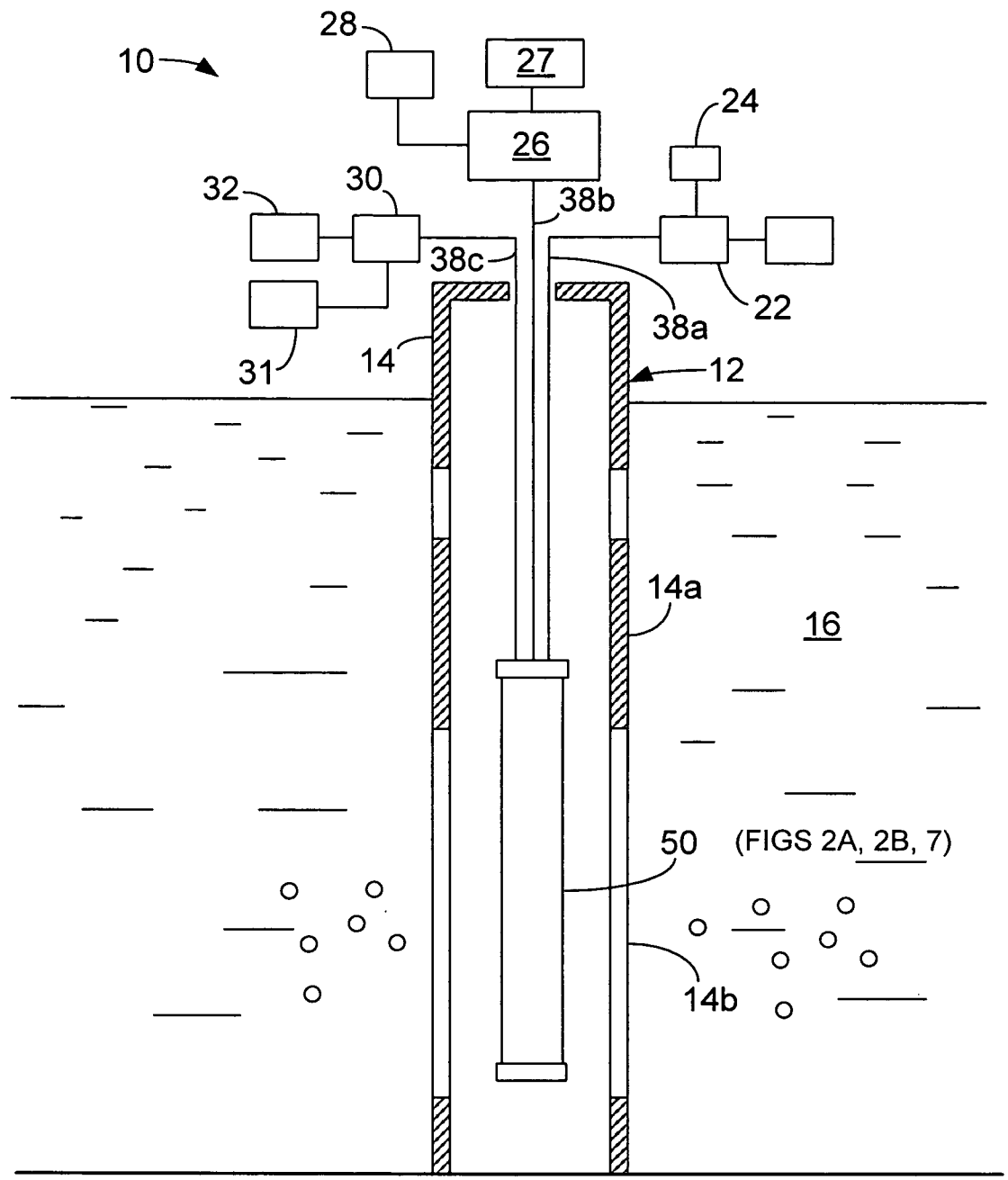
FIG. 1 is a cross-sectional view showing a sparging treatment system.
Figure 7:
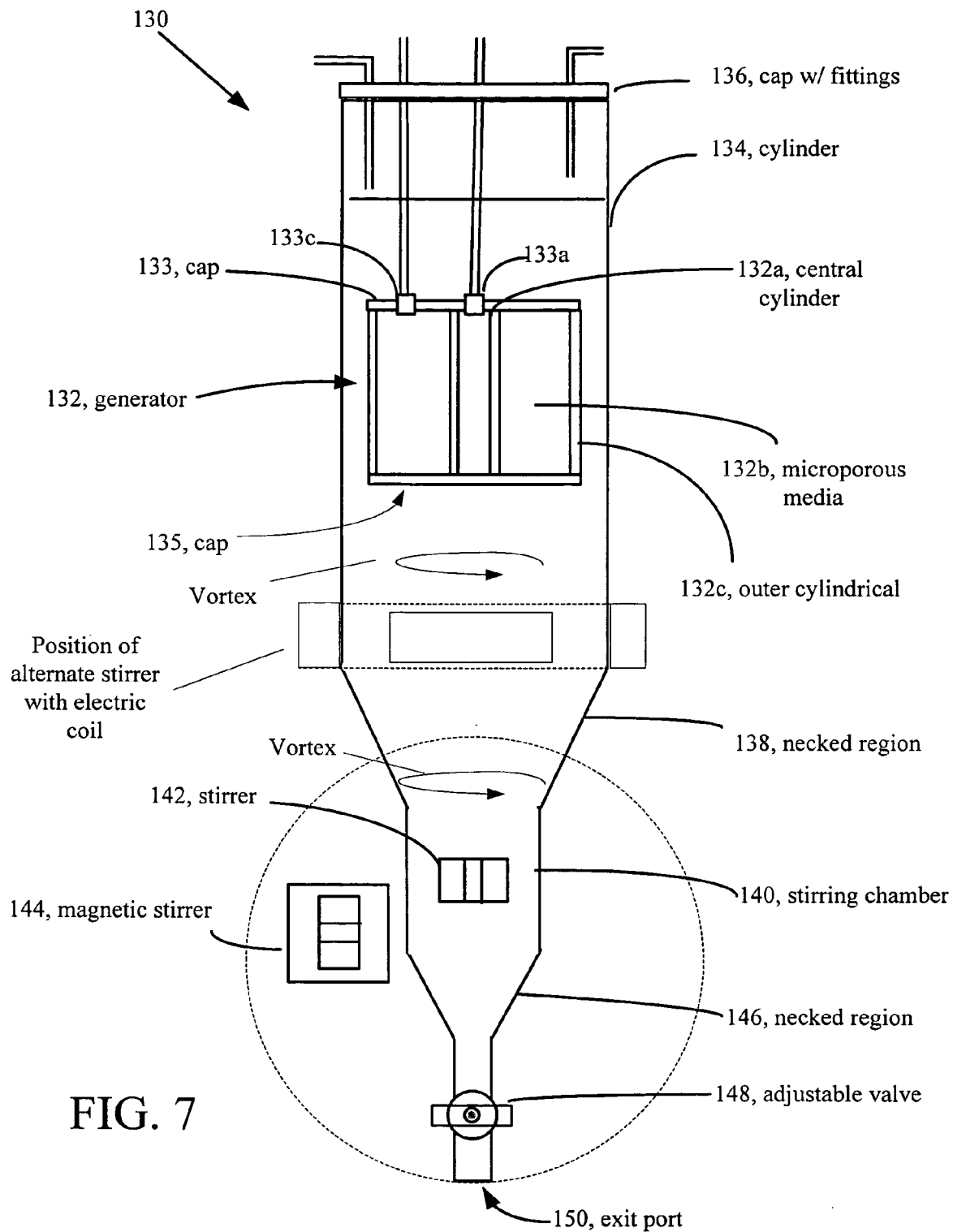
FIG. 7 is a diagrammatical, longitudinal cross-section view of an alternative multi-fluid diffuser useful in the arrangements of FIGS. 1, 2 and 6.

Referring now to FIG. 1, a sparging arrangement 10 for use with plumes, sources, deposits or occurrences of contaminants, is shown. The arrangement 10 is disposed in a well 12 that has a casing 14 with an inlet screen 14a and outlet screen 14b to promote a re-circulation of water into the casing 14 and through the surrounding ground/aquifer region 16. The casing 14 supports the ground about the well 12. Disposed through the casing 14 are one or more multi-fluid diffusers, e.g., 50, 50' (discussed in FIGS. 3 and 4) or alternatively in some applications the multi-fluid diffuser 130 (FIG. 7).

The arrangement 10 also includes a first pump or compressor 22 and a pump or compressor control 24 to feed a first fluid, e.g., a gas such as an ozone/air or oxygen enriched air mixture, as shown, or alternatively, a liquid, such as, hydrogen peroxide or a hydroperoxide, via feed line 38a to the multi-fluid diffuser 50. The arrangement 10 includes a second pump or compressor 26 and control 27 coupled to a source 28 of a second fluid to feed the second fluid via feed line 38b to the multi-fluid diffuser 50. A pump 30, a pump control 31, and a source 32 of a third fluid are coupled via a third feed 38c to the multi-fluid diffuser 50.

The arrangement 10 can supply nutrients such as catalyst agents including iron containing compounds such as iron silicates or palladium containing compounds such as palladized carbon. In addition, other materials such as platinum may also be used.

Figures 3, 4:
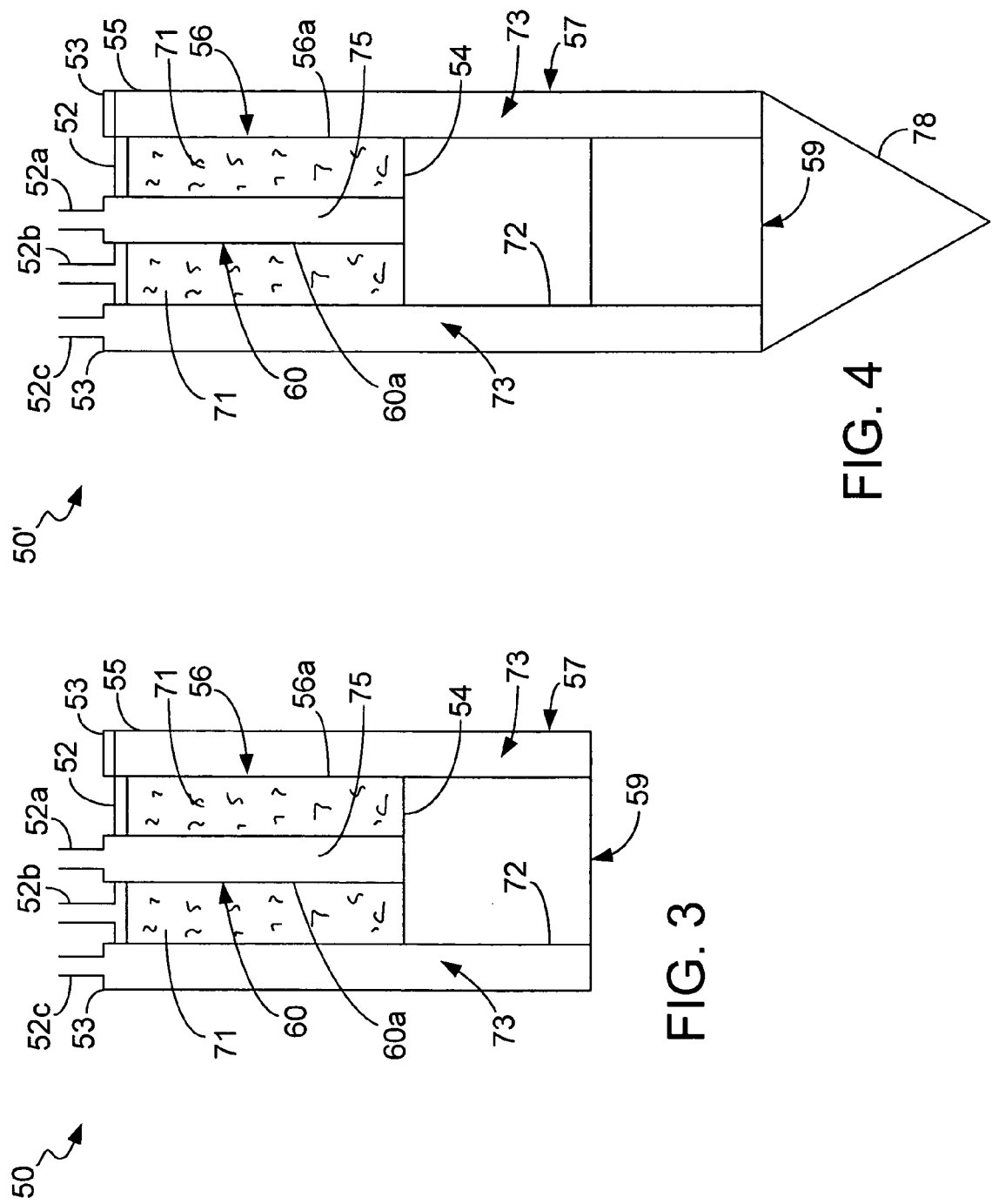
FIG. 3 is a longitudinal cross-section view of a multi-fluid diffuser useful in the arrangement of FIG. 1.
FIG. 4 is a longitudinal cross-section view of an alternative multi-fluid diffuser useful in direct injection into shallow contaminant formations.

The arrangement 10 makes use of a laminar multi-fluid diffuser 50 (FIG. 3 or FIG. 4). The laminar multi-fluid diffuser 50 allows introduction of multiple, fluid streams, with any combination of fluids as liquids or gases. The laminar multi-fluid diffuser 50 has three inlets. One of the inlets introduces a first gas stream within interior regions of the multi-fluid diffuser, a second inlet introduces a fluid through porous materials in the laminar multi-fluid diffuser 50, and a third inlet introduces a third fluid about the periphery of the laminar multi-fluid diffuser 50. The fluid streams can be the same materials or different.

In the embodiment described, the first fluid stream is a gas such as an ozone/air mixture, the second is a liquid such as hydrogen peroxide, and the third is liquid such as water. The outward flow of fluid, e.g., air/ozone from the first inlet 52a results in the liquid, e.g., the hydrogen peroxide in the second flow to occur under a siphon condition developed by the flow of the air/ozone from the first inlet 52a.

Alternatively, the flows of fluid can be reversed such that, e.g., air/ozone from the second inlet 52a and the liquid, e.g., the hydrogen peroxide flow from first inlet, to have the ozone stream operate under a siphon condition, which can be used to advantage when the arrangement is used to treat deep deposits of contaminants. The ozone generator operating under a siphon condition is advantageous since it allows the ozone generator to operate at optimal efficiency and delivery of optimal amounts of ozone into the well, especially if the ozone generator is a corona discharge type. In this embodiment, the third fluid flow is water. The water is introduced along the periphery of the multi-fluid diffuser 50 via the third inlet.

Figure 2:
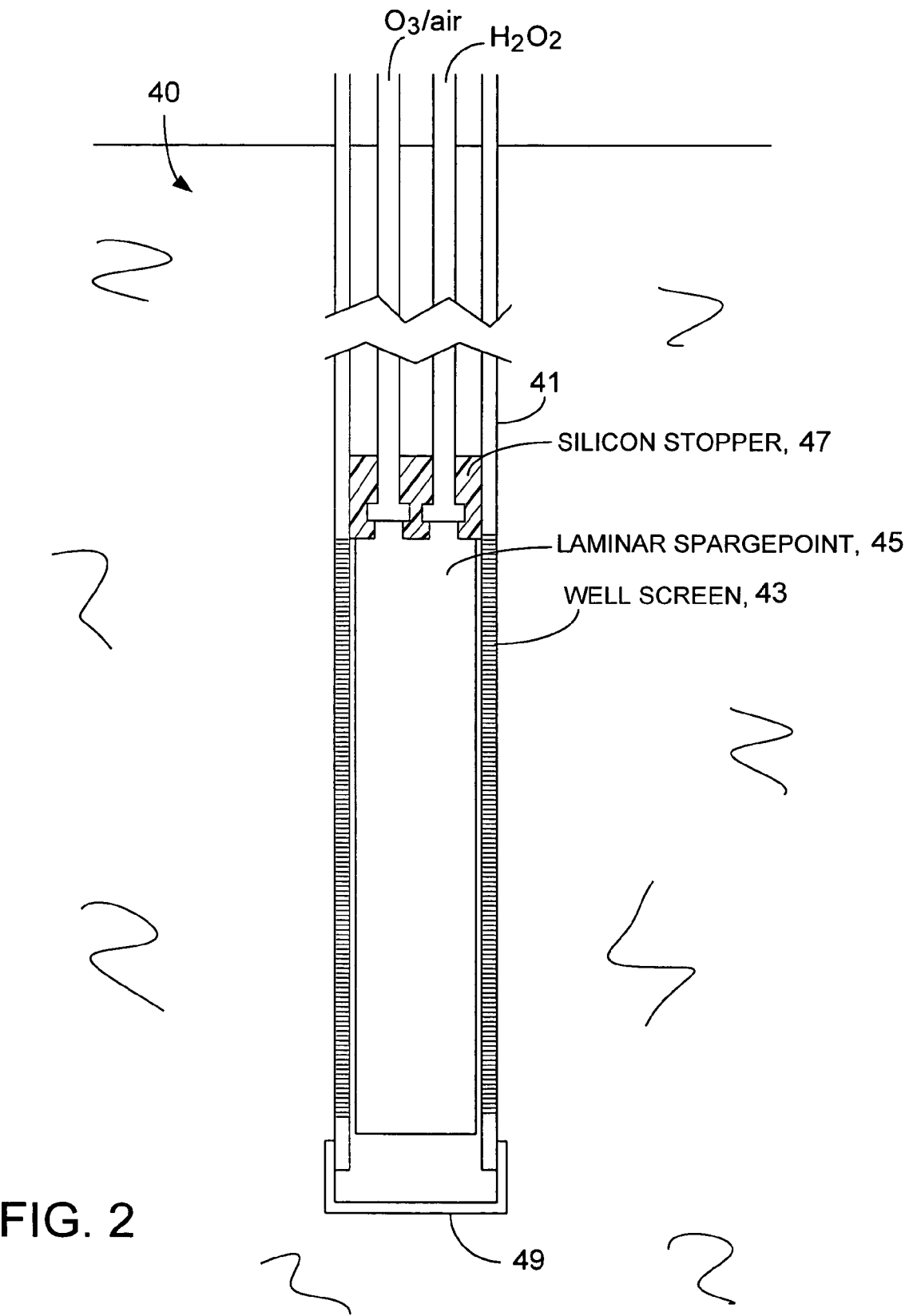
FIG. 2 is a cross-sectional view showing a sparging treatment system with well screen and a multi-fluid diffuser.

Referring to FIG. 2, an alternate arrangement 40 to produce the fine bubbles is shown. A well casing 41 is injected or disposed into the ground, e.g., below the water table. The casing 41 carries, e.g., a standard 10-slot well-screen 43. A laminar microporous diffuser 45 is disposed into the casing 41 slightly spaced from the well screen 43. A very small space is provided between the laminar microporous diffuser 45 and the 10-slot well screen. In one example, the laminar microporous diffuser 45 has an outer diameter of 2.0 inches and the inner diameter of the well casing is 2.0 inches. The laminar microporous diffuser 45 is constructed of flexible materials (described below) and as the laminar microporous diffuser 45 is inserted into the casing 41 it flexes or deforms slightly so as to fit snugly against the casing 41. In general for a 2 inch diameter arrangement a tolerance of about +/− 0.05 inches is acceptable. Other arrangements are possible. The bottom of the casing 41 is terminated in an end cap. A silicon stopper 47 is disposed over the LAMINAR SPARGEPOINT® type of microporous diffuser available from Kerfoot Technologies, Inc. and also described in U.S. Pat. No. 6,436,285. The silicone stopper 47 has apertures to receive feed lines from the pumps (as in FIG. 1, but not shown in FIG. 2).

Exemplary operating conditions are set forth in TABLE 1.

For In-situ Type Applications

TABLE 1

| Unit | Air | Ozone gm/day | Hydroperoxide gal/day | Water Flow gal/min | Recirculation Wells | Laminar microporous diffuser with screen | Operating pressure (psi) |
|---|---|---|---|---|---|---|---|
| Wall mount | 3-5 cfm | 144-430 | 5-50 | 1-3 | 1-4 | 1-8 | 0-30 |
| Palletized | 10-20 cfm | 300-1000 | 20-200 | 1-10 | 1-8 | 1-16 | 0-100 |
| Trailer | 20-100 cfm | 900-5000 | 60-1000 | 1-50 | 1-20 | 1-40 | 0-150 |

Flow rates are adjusted to a pressure that offsets groundwater hydraulic head and formation backpressures. In general, pressures of, e.g., above 40 psi ambient are avoided so as to prevent fracture or distortion of microscopic flow channels. The percent concentration of hydroperoxide in water is typically in a range of 2-20 percent, although other concentrations can be used. The flow is adjusted according to an estimate of the total mass of the contaminants in the soil and water. If high concentrations (e.g., greater than 50,000 parts per billion in water or 500 mg/kg in soil) of the contaminants are present, sufficient hydroperoxides are added to insure efficient decomposition by the Criegee reaction mechanism or hydrogen peroxide to augment hydroxyl radical formation.

Extremely fine bubbles from an inner surface of the microporous gas flow and water (including a hydroperoxide, e.g., hydrogen peroxide) are directed by lateral laminar flow through the porous material or closed spaced plates (FIG. 2). The gas to water flow rate is held at a low ratio, e.g., sufficiently low so that the effects of coalescence are negligible and the properties of the fluid remain that of the entering water.

Alternatively, the water flow is oscillated (e.g., pulsed), instead of flowing freely, both to reduce the volume of water required to shear, and maintain the appropriate shear force at the interactive surface of the gas-carrying microporous material. Johnson et al., Separation Science and Technology, 17(8), pp. 1027-1039, (1982), described that under non-oscillating conditions, separation of a bubble at a microporous frit surface occurs when a bubble radius is reached such that drag forces on the bubble equal the surface tension force $\pi D\delta$, as:

$$C_D \left[ \frac{\rho U_o^2 A_p}{2} \right] = \pi D \delta$$

where $C_D$ is the constant analogous to the drag coefficient, $\rho$ is the fluid density, $U_o^2$ is the fluid velocity, $A_p$ is the projected bubble area, $\pi$ is pi, 3.14, a constant, $\delta$ is the gas-water surface tension, and D is the pore diameter of the frit. A bubble is swept from the microporous surface when the bubble radius is reached such that the dynamic separating force due to drag equals the retention force due to surface tension. Bubble distributions of 16 to 30 μ (micron) radius and 1 to $4\times10^6$ bubbles/min can be produced with a gas flow rate of 8 cm³/min and rotational water flow rates of 776 cm³/min across a microporous surface of μ (micron) pore size with a 3.2 cm diameter surface area. If the flow of liquid is directed between two microporous layers in a fluid-carrying layer, not only is a similar distribution of microbubble size and number of microbubbles produced, but, the emerging bubbles are coated with the liquid which sheared them off.

In order to decompose certain dissolved recalcitrant compounds, a stronger oxidation potential is necessary for reaction. Ozone in the dissolved form is a recognized strong reagent for dissolved organics but has a short 15 to 30 minute half-life. By reducing the size of gas bubbles to the point where the vertical movement is very low, ozone in a gaseous form can co-exist with dissolved forms as a homogenous mixture. The half-life of gaseous ozone is much longer than dissolved forms, ranging 1 to 20 hours. As the bubbles of ozone become nano size, the surface area to volume ratio exceeds 1.0 and approaches ranges of 5 to 30, thus providing an exceptional capacity to withdraw smaller saturated molecules towards the surfaces from Henry's partitioning. However, the behavior of the nanobubble ozone indicates a new form of ozone where the resonating triatom orients itself to form a membrane which changes surface tension within the water. This allows the production of nano-sized bubbles of ozone which cannot be produced by using air or nitrogen gas under similar conditions of gas flow shear and pressure.

Characteristics of varying sizes bubbles entrapping ozone are depicted in Table II.

TABLE II

| Diameter (microns) | Surface Area $4\pi r^2$ | Volume $4/3 \pi r^3$ | Surface Area/Volume |
|---|---|---|---|
| 200 | 124600 | 4186666 | .03 |
| 20 | 1256 | 4186 | 0.3 |
| 2 | 12.6 | 4.2 | 3.2 |
| .2 | .13 | .004 | 32 |

In addition to using a continual flow of fluid to shear the outside surfaces on the cylindrical generator, the liquid can be oscillated (pulsed) at a frequency sufficient to allow for fluid replacement in the microporous diffuser, for the volume of liquid removed as coatings on the bubbles, but not allowing interruption of the liquid/bubble column on its way to the surface (or through a slit, e.g., well screen slot). To avoid coalescing of the microbubbles, a continual stream of micro to nanobubbles, actually coated with the peroxide liquid is emitted from the surface of the laminated generator.

Some examples of gas flows and liquid volumes are listed below in Table III for each of the examples described in FIGS. 1 and 2.

TABLE III

| Per 8 cm surface area, (5 μm (micron) porosity) | | | |
|---|---|---|---|
| Rotational Water Flow rates 10 cm³/min gas | Mean Bubble size (μm) | Bubble size range (μm) | Rotative Frequency bubbles/min |
| 250 cm³/min | 30 | 16-60 | $4 \times 10^6$ |
| 500 cm³/min | 20 | 16-50 | $7 \times 10^6$ |
| 800 cm³/min | 15 | 8-30 | $15 \times 10^6$ |
| 1500 cm³/min | 10 | 5-15 | $30 \times 10^6$ |
| 3000 cm³/min | 5 | .5-10 | $50 \times 10^6$ |
| 5000 cm³/min | 2 | .2-6 | $80 \times 10^6$ |
| 5000 cm³/min | <1 | .1-5 | $100 \times 10^6$ |

For an equivalent LAMINAR SPARGEPOINT® type of microporous diffuser available from Kerfoot Technologies, Inc. (formally KV-Associates (2 INCH OUTER DIAMETER)

For Laminar Spargepoint®

Porous Surface Area is 119 sq. in. (771 sq. cm.)

Gas flow 25000 cm³/min (25 l/min) or (0.8825 cu. ft/min)= 52.9 cu. ft./hr.

(20 cfm)=1200 cu. ft./hr (L×0.264=gallons)

Liquid flow

If continuous: 625 l/min (165 gallons/min) or 2000 gallons/day

If oscillate: 5 gallons/day

The liquid is supplied with a Pulsafeeder® pulsing peristaltic pump to oscillate the liquid (5 psi pulse/sec) and to deliver an adjustable 0.1 to 10 liters/hour (7 to 60 gallons/day).

| TWO LAMINAR MICROPOROUS MATERIALS OSCILLATING GAS | | | |
|---|---|---|---|
| GAS FLOW 50 scf | WATER FLOW 200-800 ccm/min | BUBBLE SIZE (μm) | FREQUENCY Bubbles/min. |
| 1 cfm | 1 L/min (.26 gallons/min) | 5 μm | $10 \times 10^8$ |
| 3 cfm | 3 L/min (.78 gallons/min) | 5 μm | $10 \times 10^8$ |
| 30 cfm[1] | 30 L/min (7.8 gallons/min) | 5 μm | $10 \times 10^8$ |

(2 inch 800 sq. cm. LAMINAR SPARGEPOINT ® type of microporous diffuser available from Kerfoot Technologies, Inc.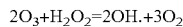
[1]Would require ten (10) LAMINAR SPARGEPOINT ® type of microporous diffuser for operation, or increase length or diameter of the microporous diffuser).

For insertion of the LAMINAR SPARGEPOINT® type of microporous diffuser into well screens or at depth below water table, the flow of gas and liquid is adjusted to the back pressure of the formation and, for gas reactions, the height (weight) of the water column. At ambient conditions (corrected for height of water column), the liquid fraction is often siphoned into the exiting gas stream and requires no pressure to introduce it into the out flowing stream. The main role of an oscillating liquid pump is to deliver a corresponding flow of liquid to match a desired molar ratio of ozone to hydrogen peroxide for hydroxyl radical formation as:

$$2O_3 + H_2O_2 = 2OH\cdot + 3O_2$$

Set out below are different operating conditions for different types of systems available from Kerfoot Technologies, Inc. (formally KV-Associates, Inc.) Mashpee Mass. Other systems with corresponding properties could be used.

Wallmount Unit
Pressure range, injection: 10 to 40 psi
Gas flow: 1-5 Scfm (50 to 100 ppmv ozone)
Liquid range: 0.03-0.5 gallons/hr. (55 gallon tank) (3 to 8% peroxide).
Shearing fluid (water)
Palletized units
Pressure range-injection: 10 to 100 psi
Gas flow: 0-20 cfm (50 to 2000 ppmv ozone)
Liquid range: 0-5 gallons/hr (3 to 9% peroxide)
Shearing fluid (water)
Trailer units
Pressure range-injection: 10 to 150 psi
Gas flow: 0-100 cfm (50 to 10,000 ppmv ozone)
Liquid range: 0-20 gallons/hr (3 to 9% peroxide)
Shearing fluid (water)

The process involves generation of extremely fine microbubbles (sub-micron in diameter up to less than about 5 microns in diameter) that promote rapid gas/gas/water reactions with volatile organic compounds. The production of microbubbles and selection of appropriate size distribution optimizes gaseous exchange through high surface area to volume ratio and long residence time within the material to be treated. The equipment promotes the continuous or intermittent production of microbubbles while minimizing coalescing or adhesion.

The injected air/ozone combination moves as a fluid of such fine bubbles into the material to be treated. The use of microencapsulated ozone enhances and promotes in-situ stripping of volatile organics and simultaneously terminates the normal reversible Henry's reaction.

The basic chemical reaction mechanism of air/ozone encapsulated in micron-sized bubbles is further described in several of my issued patents such as U.S. Pat. No. 6,596,161 "Laminated microporous diffuser"; U.S. Pat. No. 6,582,611 "Groundwater and subsurface remediation"; U.S. Pat. No. 6,436,285 "Laminated microporous diffuser"; U.S. Pat. No. 6,312,605 "Gas-gas-water treatment for groundwater and soil remediation"; and U.S. Pat. No. 5,855,775, "Microporous diffusion apparatus" all of which are incorporated herein by reference.

The compounds commonly treated are HVOCs (halogenated volatile organic compounds), PCE, TCE, DCE, vinyl chloride (VC), EDB, petroleum compounds, aromatic ring compounds like benzene derivatives (benzene, toluene, ethylbenzene, xylenes). In the case of a halogenated volatile organic carbon compound (HVOC), PCE, gas/gas reaction of PCE to by-products of HCl, $CO_2$ and $H_2O$ accomplishes this. In the case of petroleum products like BTEX (benzene, toluene, ethylbenzene, and xylenes), the benzene entering the bubbles reacts to decompose to CO2 and H2O. In addition, through the production of hydroxyl radicals (.OH) or perhydroxyl radicals (.OOH) or atomic oxygen O ($^3$P) from sonic enhancement, additional compounds can be more effectively attacked, like acetone, alcohols, the alkanes and alkenes.

Also, pseudo Criegee reactions with the substrate and ozone appear effective in reducing saturated olefins like trichloro ethane (1,1,1-TCA), carbon tetrachloride ($CCl_4$), chloroform and chlorobenzene, for instance.

Other contaminants that can be treated or removed include hydrocarbons and, in particular, volatile chlorinated hydrocarbons such as tetrachloroethene, trichloroethene, cisdichloroethene, transdichloroethene, 1-1-dichloroethene and vinyl chloride. In particular, other materials can also be removed including chloroalkanes, including 1,1,1 trichloroethane, 1,1, dichloroethane, methylene chloride, and chloroform, O-xylene, P-xylene, naphthalene and methyltetrabutylether (MTBE) and 1,4 Dioxane.

Ozone is an effective oxidant used for the breakdown of organic compounds in water treatment. The major problem in effectiveness is that ozone has a short lifetime. If ozone is mixed with sewage containing water above ground, the half-life is normally minutes. To offset the short life span, the ozone is injected with multi-fluid diffusers 50, enhancing the selectiveness of action of the ozone. By encapsulating the ozone in fine bubbles, the bubbles would preferentially extract volatile compounds like PCE from the mixtures of soluble organic compounds they encountered. With this process, volatile organics are selectively pulled into the fine air bubbles. The gas that enters a small bubble of volume ($4\pi r^3$) increases until reaching an asymptotic value of saturation.

The following characteristics of the contaminants appear desirable for reaction:
Henry's Constant: $10^{-1}$ to $10^{-5}$ atm-m$^3$/mol
Solubility: 10 to 10,000 mg/l
Vapor pressure: 1 to 3000 mmHg
Saturation concentration: 5 to 100 g/m$^3$ The production of micro to nano sized bubbles and of appropriate size distribution are selected for optimized gas exchange through high surface area to volume ratio and long residence time within the area to be treated.

Referring now to FIG. 3, a multi-fluid diffuser 50 is shown. The multi-fluid diffuser 50 includes inlets 52a-52c, coupled to portions of the multi-fluid diffuser 50. An outer member 55 surrounds a first inner cylindrical member 56. Outer member 55 provides an outer cylindrical shell for the multi-fluid diffuser 50. First inner cylindrical member 56 is comprised of a hydrophobic, microporous material. The microporous material can has a porosity characteristic less than 200 microns in diameter, and preferable in a range of 0.1 to 50 microns, most preferable in a range of 0.1 to 5 microns to produce nanometer or sub-micron sized bubbles. The first inner member 56 surrounds a second inner member 60. The first inner member 56 can be cylindrical and can be comprised of a cylindrical member filled with microporous materials. The first inner member 56 would have a sidewall 56a comprised of a large plurality of micropores, e.g., less than 200 microns in diameter, and preferable in a range of 0.1 to 50 microns, most preferable in a range of 0.1 to 5 microns to produce nanometer or sub-micron sized bubbles.

A second inner member 60 also cylindrical in configuration is coaxially disposed within the first inner member 56. The second inner member 60 is comprised of a hydrophobic material and has a sidewall 60a comprised of a large plurality of micropores, e.g., less than 200 microns in diameter, and preferable in a range of 0.1 to 50 microns, most preferable in a range of 0.1 to 5 microns to produce nanometer or sub-micron sized bubbles. In one embodiment, the inlet 52a is supported on an upper portion of the second inner member 60, and inlets 52b and 52c are supported on a top cap 52 and on a cap 53 on outer member 55. A bottom cap 59 seals lower portion of outer member 55.

Thus, proximate ends of the cylindrical members 56 and 60 are coupled to the inlet ports 52b and 52a respectively. At the opposite end of the multi-fluid diffuser 50 an end cap 54 covers distal ends of cylindrical members 56 and 60. The end cap 54 and the cap 52 seal the ends of the multi-fluid diffuser 50. Each of the members 55, 56 and 60 are cylindrical in shape.

Member 55 has solid walls generally along the length that it shares with cylindrical member 60, and has well screen 57 (having holes with diameters much greater than 200 microns) attached to the upper portion of the outer member. Outer member 55 has an end cap 59 disposed over the end portion of the well-screen 57. The multi-fluid diffuser 50 also has a member 72 coupled between caps 54 and 57 that provide a passageway 73 along the periphery of the multi-fluid diffuser 50. Bubbles emerge from microscopic openings in sidewalls 60a and 56a, and egress from the multi-fluid diffuser 50 through the well screen 57 via the passageway 73.

Thus, a first fluid is introduced through first inlet 52a inside the interior 75 of third member 60, a second fluid is introduced through the second inlet 52b in region 71 defined by members 56 and 60, and a third fluid is introduced through inlet 52c into an outer passageway 73 defined between members 53, 55, 56, and 59. In the system of FIG. 1, the first fluid is a gas mixture such as ozone/air that is delivered to the first inlet through central cavity 75. The second fluid is a liquid such as hydrogen peroxide, which coats bubbles that arise from the gas delivered to the first inlet, and the third fluid is a liquid such as water, which is injected through region 73 and acts as a shearing flow to shear bubbles off of the sidewall 56a. By adjusting the velocity of the shearing fluid, bubbles of very small size can be produced (e.g., sub-micron size). Of course adjusting the conditions and porosity characteristics of the materials can produce larger size bubbles.

Referring to FIG. 4, an alternative embodiment 50' has the cylindrical member 56 terminated along with the member 60 by a point member 78. The point member 78 can be used to directly drive the multi-fluid diffuser into the ground, with or without a well. The point member can be part of the cap 59 or a separate member as illustrated.

The multi-fluid diffuser 50 or 50' is filled with a microporous material in the space between members 56 and 60. The materials can be any porous materials such as microbeads with mesh sizes from 20 to 200 mesh or sand pack or porous hydrophilic plastic to allow introducing the second fluid into the space between the members 56 and 60.

In operation, the multi-fluid diffuser 50 is disposed in a wet soil or an aquifer. The multi-fluid diffuser 50 receives three fluid streams. In one embodiment, the first stream that is fed to the inlet 52a is a liquid such as water, whereas second and third streams that feed inlets 52b and 52c are hydrogen peroxide and a gas stream of air/ozone. The multi-fluid-diffuser 50 has water in its interior, occasioned by its introduction into the aquifer. The air ozone gas stream enters the multi-fluid diffuser 50 and diffuses through the cylindrical member 56 as trapped microbubbles into the space occupied by the microporous materials where a liquid, e.g., hydrogen peroxide is introduced to coat the microbubbles. The liquid stream through the microporous materials is under a siphon condition occasioned by the introduction of water through the periphery of the multi-fluid diffuser 50. The flow of water in additional to producing a siphoning effect on the liquid introduced through inlet 52b also has a shearing effect to shear bubbles from the microporous sides of the cylindrical member 60, preventing coalescing and bunching of the bubbles around micropores of the cylindrical member 60. The shearing water flow carries the microbubbles away through the well screen disposed at the bottom of the multi-fluid diffuser 50.

Figure 5A:
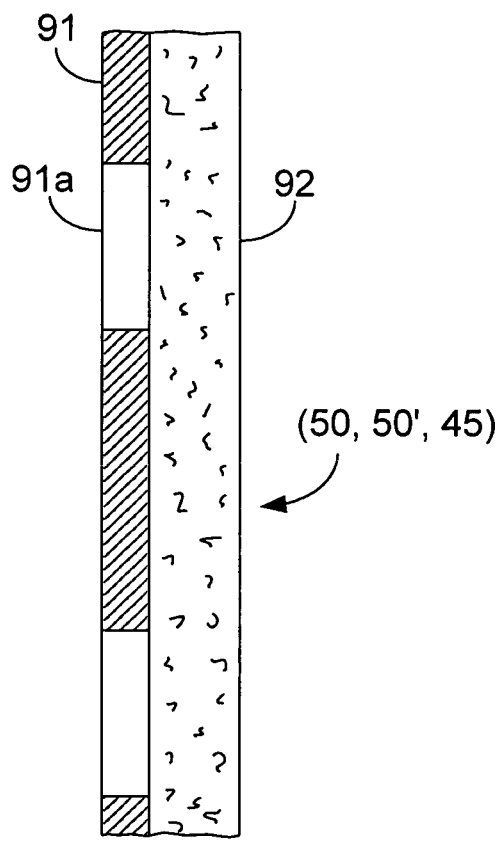
FIGS. 5A and 5B are cross-sectional view of sidewalls of the multi-fluid diffuser of FIG. 3 or 4 showing exemplary construction details.
Figure 5B:
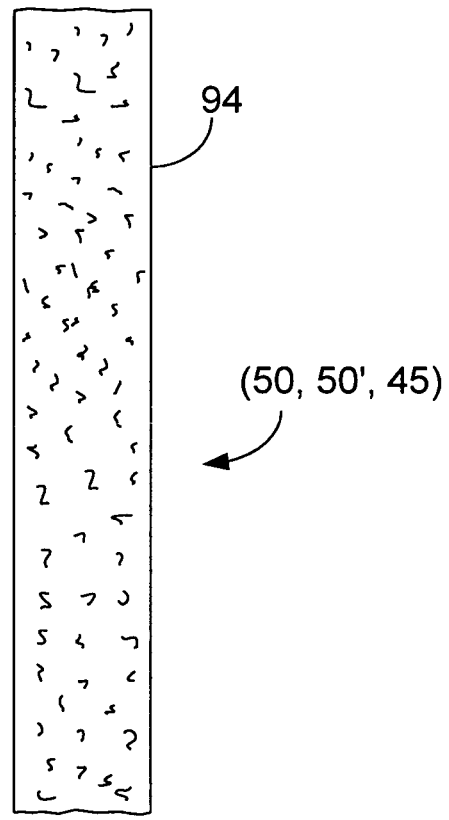

Referring now to FIGS. 5A, 5B, exemplary construction details for the elongated cylindrical members of the multi-fluid diffusers 50 or 50' and the laminar microporous diffuser 45 are shown. As shown in FIG. 5A, sidewalls of the members can be constructed from a metal or a plastic support layer 91 having large (as shown) or fine perforations 91a over which is disposed a layer of a sintered i.e., heat fused microscopic particles of plastic to provide the micropores. The plastic can be any hydrophobic material such as polyvinylchloride, polypropylene, polyethylene, polytetrafluoroethylene, high-density polyethylene (HDPE) and ABS. The support layer 91 can have fine or coarse openings and can be of other types of materials.

FIG. 5B shows an alternative arrangement 94 in which sidewalls of the members are formed of a sintered i.e., heat fused microscopic particles of plastic to provide the micropores. The plastic can be any hydrophobic material such as polyvinylchloride, polypropylene, polyethylene, polytetrafluoroethylene, high-density polyethylene (HDPE) and alkylbenzylsulfonate (ABS). Flexible materials are desirable if the laminar microporous diffuser 45 is used in an arrangement as in FIG. 2.

The fittings (i.e., the inlets in FIG. 2,) can be threaded and/or are attached to the inlet cap members by epoxy, heat fusion, solvent or welding with heat treatment to remove volatile solvents or other approaches. Standard threading can be used for example NPT (national pipe thread) or box thread e.g., (F480). The fittings thus are securely attached to the multi-fluid diffuser 50s in a manner that insures that the multi-fluid diffuser 50s can handle pressures that are encountered with injecting of the air/ozone.

Figure 6:
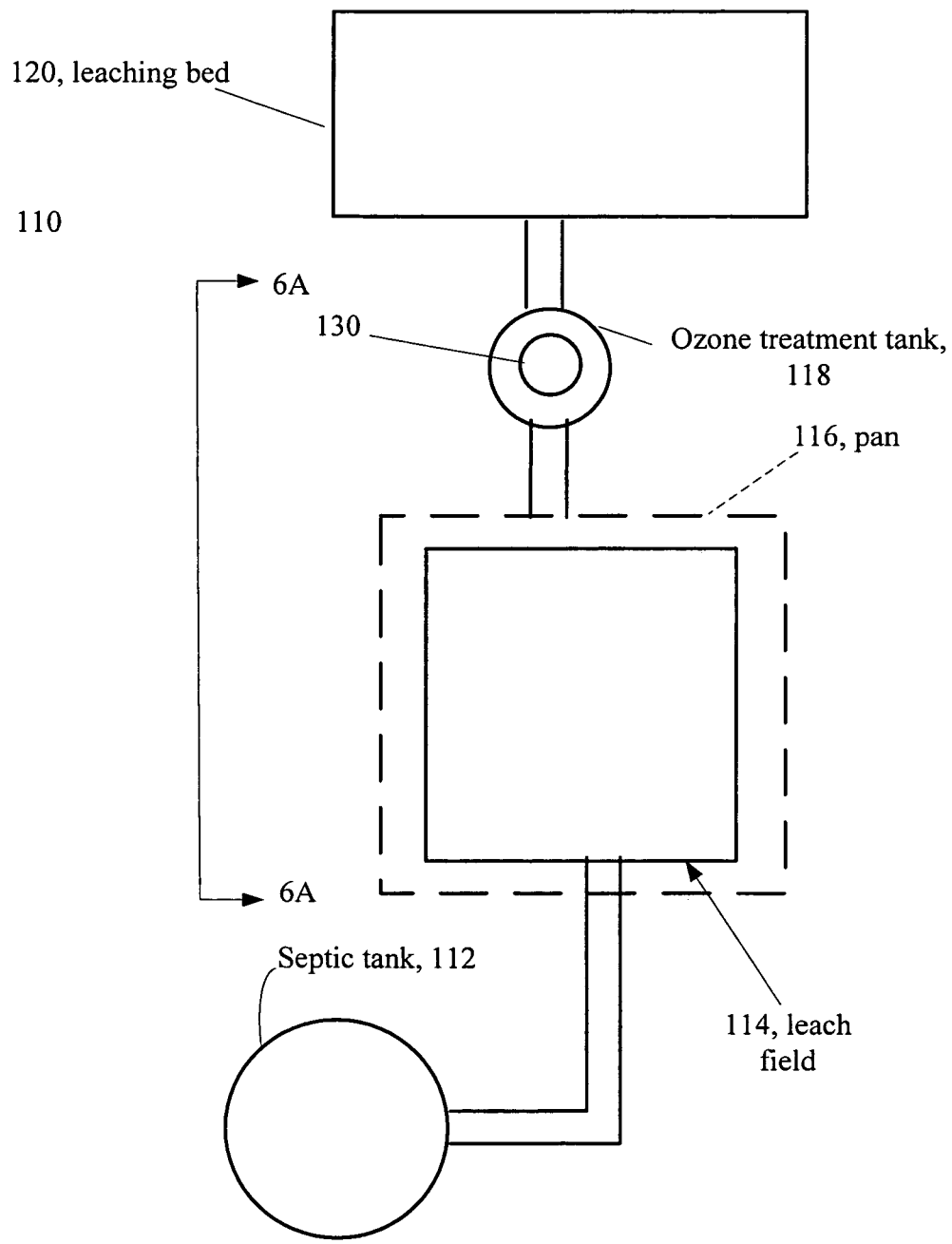
FIG. 6 is a diagrammatical plan view of a septic system.

Referring to FIGS. 6 and 6A, a septic system 110 is shown. The septic system includes a septic tank 112, coupled to a leach field 114 having perforated distribution pipes or chambers (not shown) to distribute effluent from the tank 112 within the leach field. The tank can be coupled to a residential premises or a commercial establishment. In particular, certain types of commercial establishments are of particular interest. These are establishments that produce effluent streams that include high concentration of pharmaceutical compounds, such as pharmaceutical laboratories and production facilities, hospitals and nursing homes.

The leach field 114 is constructed to have an impervious pan, 116 spaced from the distribution pipes by filter media 122 (FIG. 6A). The pan is provided to intercept and collect water from filter media 122 in the leach field after treatment and deliver the water and remaining contaminants via tube 117 to an ozone treatment tank 118. The water may still have high concentrations of nitrogen containing compounds and pharmaceutical compounds. The ozone treatment tank 118 is disposed between the leach field 120 and the final leach field 114. The first phase of treatment may also employ a denitrification system with 1 or 2 leaching fields. The ozone treatment tank 118 temporarily stores the collected water from the pan 116. The ozone treatment tank 118 has an in-situ microporous diffuser, such as those described in FIGS. 3, 4 or receives a solution from a diffuser 130 described in FIG. 7, below, to inject air/ozone in the form of extremely small bubbles, e.g., less than 20 microns and at higher ozone concentrations. In addition, the diffuser (FIG. 7) is configured to supply the air/ozone in stream of water that comes from an external source rather than using the effluent from the leach field 114 to avoid clogging and other problems.

Figure 8:
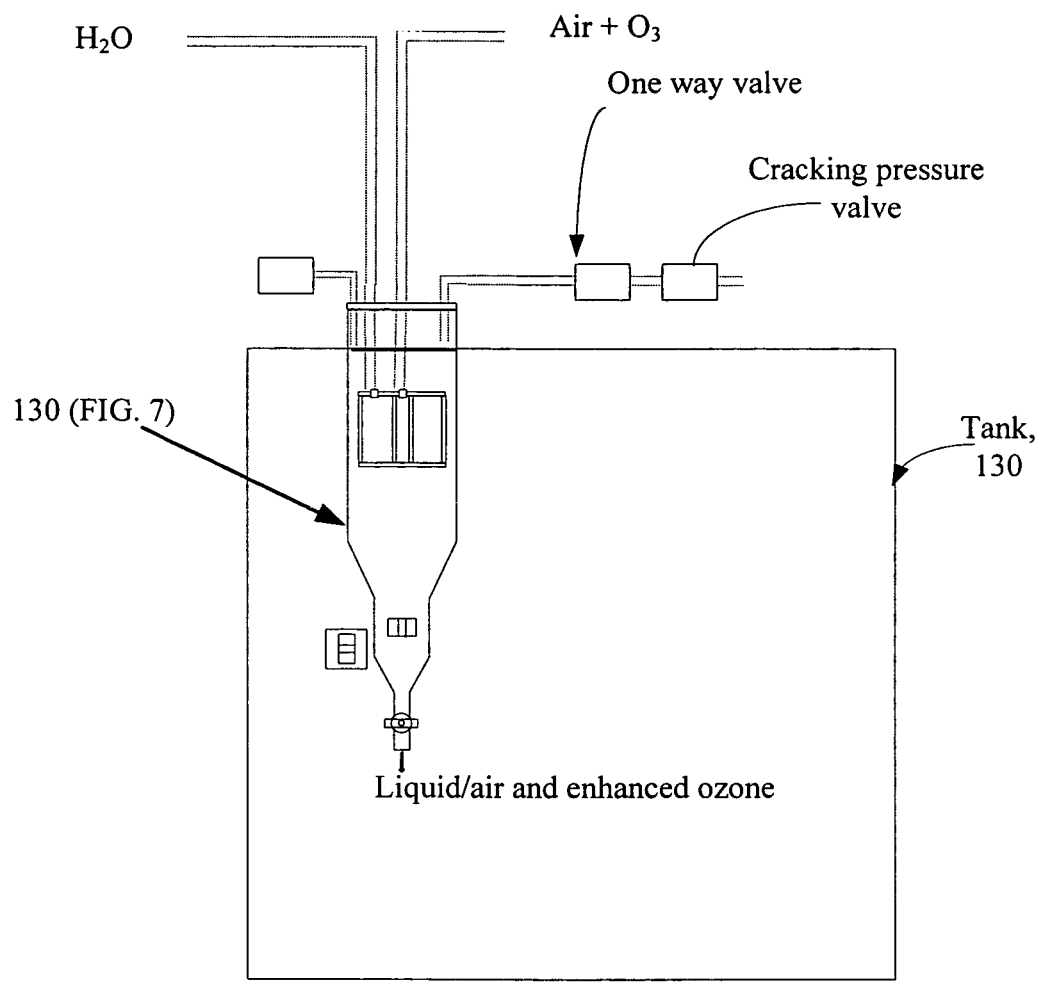
FIG. 8 is a view showing a detail of a ozone treatment chamber and the multi-fluid diffuser of FIG. 7.

In another embodiment (FIG. 6A), the bubble generator system is disposed outside of the tank 118 and has a tube 123 that feeds a porous mixing chamber 125 (static or with a stirrer) at the bottom of the tank 180. Acoustic probes, e.g., 121 can be disposed within the tips of the tubes, as shown in FIG. 6B at the egress of tube 123 and as shown in phantom at the ingress of tube 123, to further agitate and shape the bubbles. Other embodiments as shown in FIG. 8 can have the bubble generator disposed in the tank 118.

Referring now to FIG. 7, a diffuser 130 includes a bubble generator 132 disposed within a container, e.g., a cylinder 134 having impervious sidewalls, e.g. plastics such as PVDF, PVC or stainless steel. In embodiments with magnetic stirrers, the walls of the container, at least those walls adjacent to the magnetic stirrer are of non-magnetic materials.

The bubble generator 132 is comprised of a first elongated member, e.g., cylinder 132a disposed within a second elongated member, e.g., cylinder 132c. The cylinder 132a is spaced from the cylinder 132c by microporous media, e.g., glass beads or sintered glass having particle sized of, e.g., 0.01 microns to 5.0 microns, although others could be used. Fittings 133a and 133b are disposed on a cap 133 to received fluid lines (not numbered). A bottom cap 135 seals end portions of the cylinders 132a and 132b. The cylinders 132a and 132c are comprised of sintered materials having microporosity walls, e.g., average pore sizes of less than one micron. The sintered cylinder 132b or bead material with diameters of 1 to 100 microns, with a porosity of 0.4 to 40 microns, receives liquid.

Disposed in a lower portion of the cylindrical container 134 is a stirring chamber 140 provided by a region that is coupled to the cylindrical container 134 via a necked-down region 138. This region, for use with a magnetic stirrer, is comprised on non-magnetic materials, other that the stirring paddle. Other arrangements are possible such as mechanical stirrers. The stirring chamber supports a paddle that stirs fluid that exits from the necked down region 138 of cylindrical container 134 and which in operation causes a vortex to form at the bottom of the necked down region 138 and below the generator 132. A magnetic stirrer 144 is disposed adjacent the stirring chamber 140. Alternatively the stirrer can be as shown as the stirrer with electric coil (not numbered).

Figure 7A:
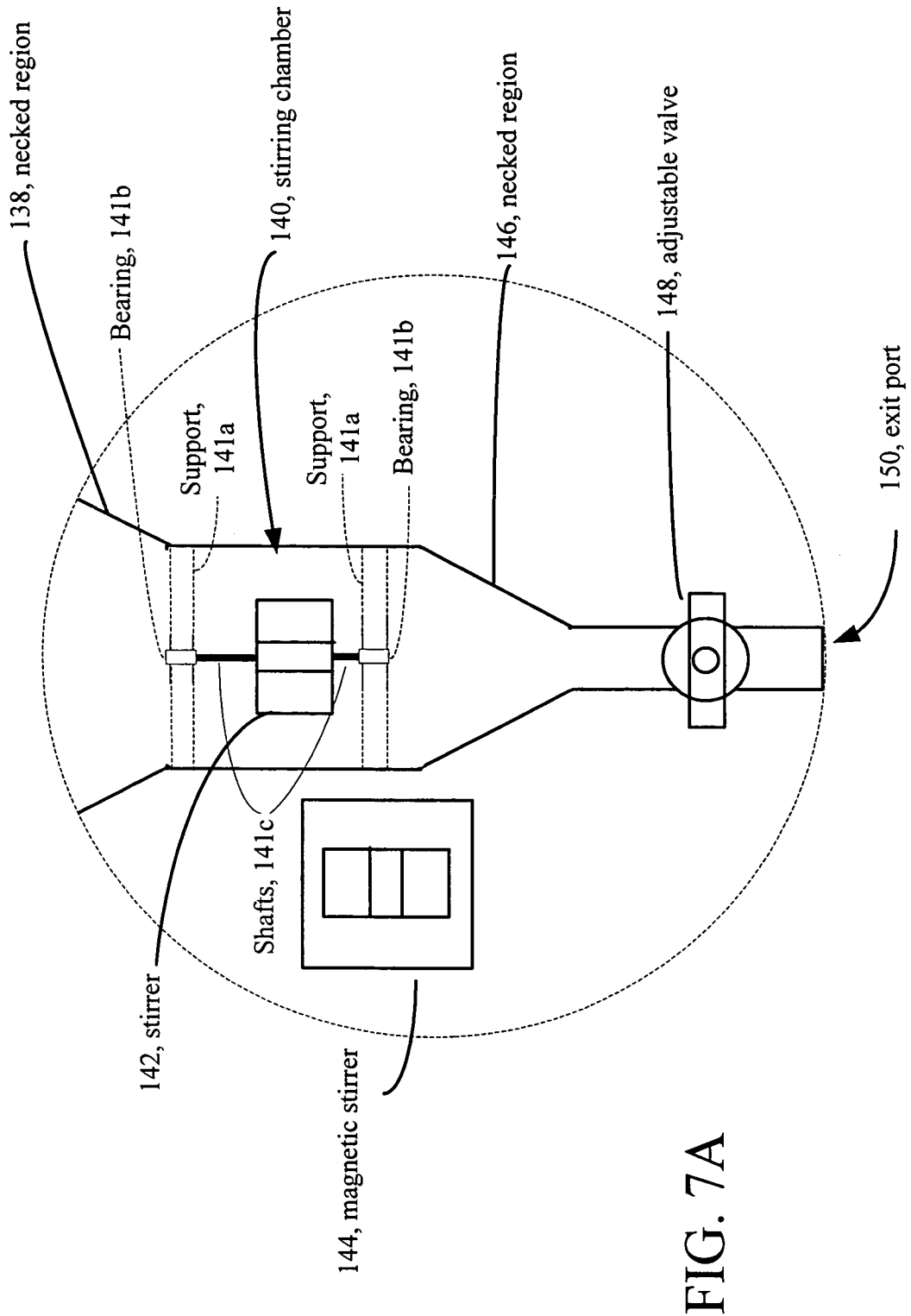
FIG. 7A is a blown up view of a portion of FIG. 7.

A second necked down region 146 couples the stirring chamber 140 to an exit port 150. Disposed in the exit port 150 is an adjustable valve 148. The adjustable valve is used to adjust the fluid flow rate out of the diffuser 130 to allow the egress rate of fluid out of the diffuser 130 to match the ingress rate of fluid into the diffuser 130. As shown in detail in FIG. 7A the stirrer 142 has shafts that are coupled to a pair of supports 141a within the stirring chamber 140, via bearings 142b or the like. Other arrangements are possible. The supports are perforated, meaning that they have sufficient open area so as not to inhibit flow of fluids. The supports can be perforated disks, as shown, or alternatively bars or rods that hold the bearings and thus the shafts for stirrer in place.

Referring now to FIG. 8, the diffuser 130 is disposed in the ozone contact tank 130. In operation, water or another liquid (e.g., Hydrogen Peroxide especially for sparging applications of FIGS. 1 and 2) is delivered to one port 133c of the generator 132 via tubing, not referenced. A dry air+Ozone stream is delivered to the other port 133a of the generator 132. As the air+ozone stream exits from walls of the cylinder 132a the air+ozone is forced out into the microporous media 132b where the air+ozone come in contact with the liquid delivered to port 132c. The liquid meets the air+ozone producing bubbles of air+ozone that are emitted from the bubble generator 132, as part of a bubble cloud of the stream of water.

The stirring action provided by the stirrer 140 produces a vortex above the stirrer 140 with cavitation of the liquid stream, producing nano size bubbles. The ideal liquid velocity is maintained at greater than 500 cc/min across a 1 micron porosity surface area of 10 $cm^2$. The stirrer maintains a rotational flow velocity of greater than 500 $cm^3$/min per 8 cm surface area, maintaining a porosity less than 5 microns.

In one arrangement, the sidewalls of the tubes have a porosity of 5 to 0.5 μm (microns), and the interstitial portion that receives liquid and has glass beads of diameter 0.1 mm or less. The sidewalls can be of sintered glass, sintered stainless steel, a ceramic or sintered plastics, such as polyvinyl chloride (PVC), high density polyethylene (HDPE), polyfluorocarbons (PVDF), Teflon.

The diffuser 130 can be continuously fed a water stream, which produces a continuous outflow of submicron size bubbles that can be directed toward a treatment, which is an advantage because the bubble generator 132 inside the diffuser 130 is not exposed to the actual waters being treated and therefore the generator 132 will not foul in the water being treated.

Figure 9:
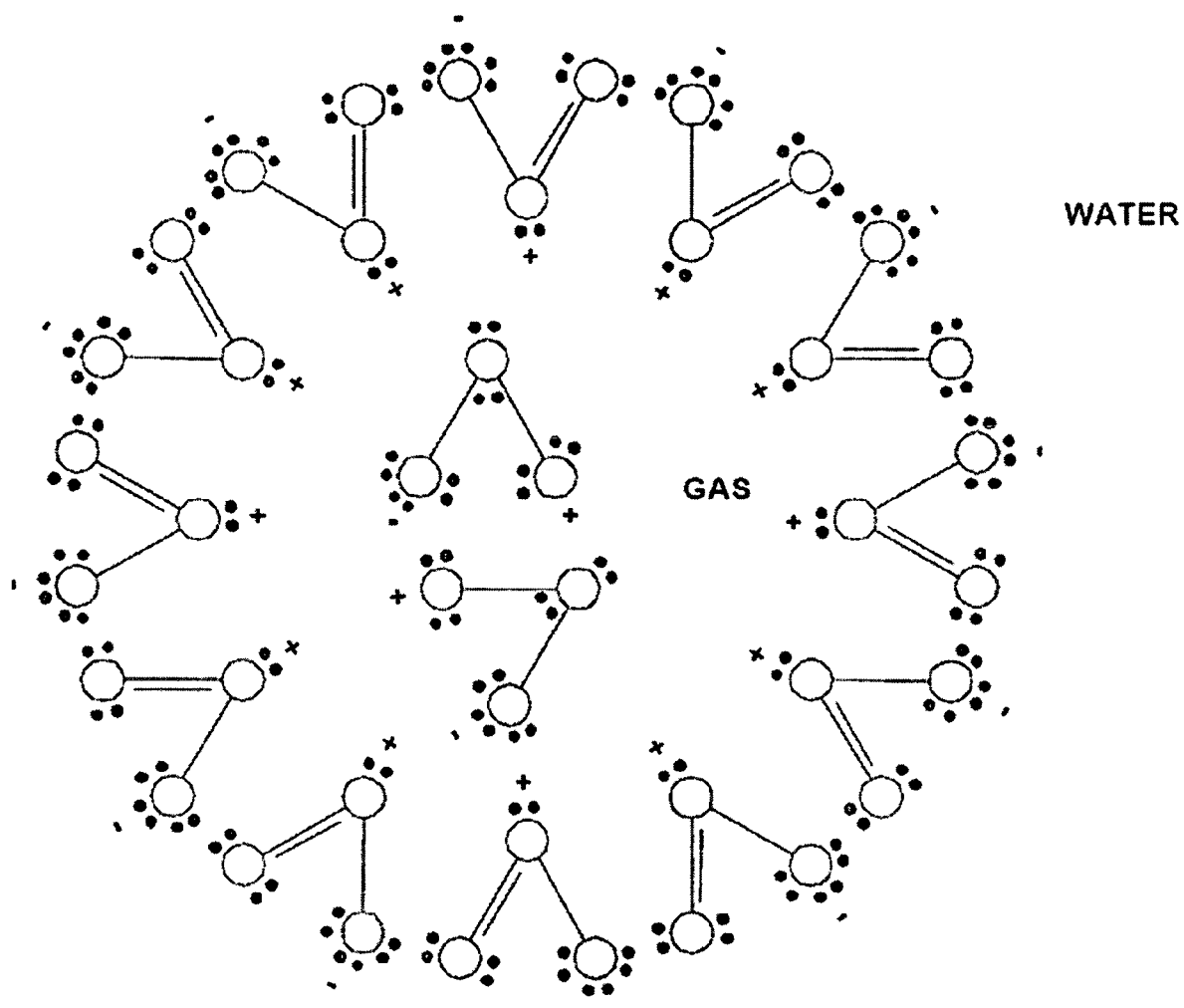
FIGS. 9 and 9A are diagrammatical views representing a structure of ozone.

Referring now to FIG. 9, a depiction of a unique bubble arrangement that occurs under specified conditions with gaseous ozone provided within extremely fine bubbles at relatively high ozone concentrations, e.g., ozone from 5 to 20% concentration with the balance air e.g., oxygen and nitrogen is shown. The arrangement has ozone, which has a polar structure of tri-atomic oxygen (ozone), forming constructs of spherical reactive "balls." As depicted, for a single slice of such a spherical ball, the ozone at the interface boundary of the gas with the water has a surface in which the ozone molecule is aligned and linked. These constructs of ozone allow very small 20 to 20,000 nanometer bubble-like spheres of linked ozone molecules to form in subsurface groundwater, which are not believed possible for simple bubbles of air alone or air with ozone at lower concentrations, due to high surface tension.

The structure shown in FIG. 9 contains gaseous ozone and air on the inside and an ozone membrane arrangement like a micelle on the gas-water interface, as shown.

As bubbles of ozone become smaller and smaller, e.g., from micron to nano size bubbles, the ozone content in the bubbles aligns, meaning that the ozone molecules on the surface of the bubble, i.e., adjacent water, orient such that the predominantly the outer oxygen atoms (negative charge) align outwards, whereas the center oxygen atom (positive or neutral charge) aligns inward.

Figure 9A:
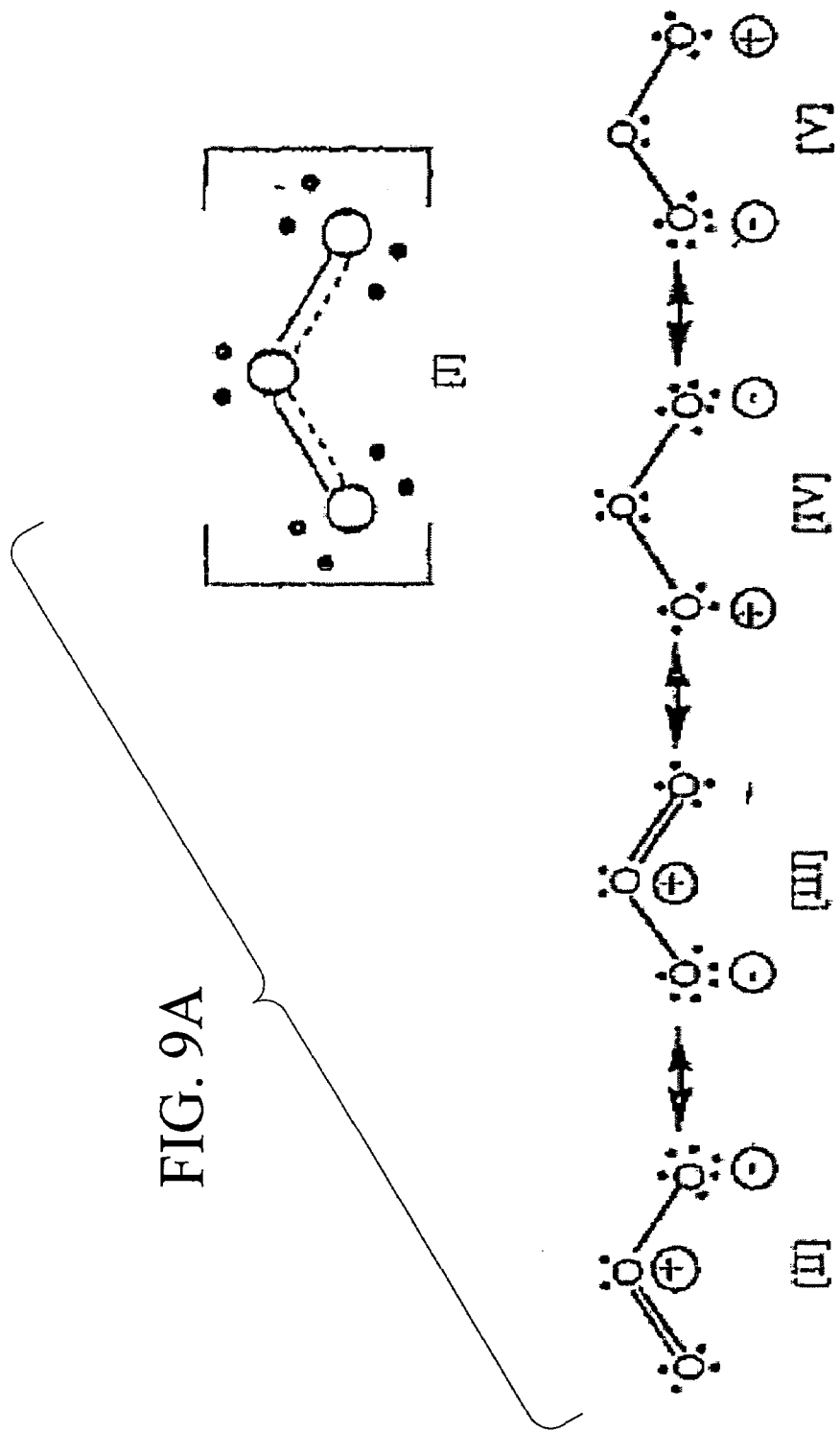

The interface between the aligned ozone molecules and surrounding water provides a reactive skin zone or interface. In this structure it is believed that the ozone "sticks" to the surface film of the water to re-orientate itself. In this orientation the ozone can resonate between two of the four theorized resonance structures of ozone, namely type II and type III (See FIG. 9A), whereas when the ozone comes in contact with a contaminant, it may switch to the more reactive forms types IV and V donating electrons to decompose the contaminate. A terminal oxygen atom thus can become positively charged so as to act as an electrophilic to attack a nucleophilic site of an organic molecule. All of the four resonance structures have a negatively charged terminal oxygen atom causing ozone to act as a nucleophile to attack an electrophilic site on an organic molecule. Ozone acting as a nucleophile can attack electron deficient carbon atoms in aromatic groups. Structures IV and V where ozone acts like a 1,3 dipole undergoes 1,3 dipole cycloaddition with unsaturated bonds to result in a classical formation of the Criegee primary ozonide.

The membrane (skin-like) structure of the ozone depicted in FIG. 9 can be a formidable resonance reactor because as volatile organic compounds are pulled into the structure (according to Henry's law) when the compounds come in contact with the skin-like structure electron flow can quickly proceed for substitution reactions. With excess ozone gas in the bubble, replacement of the lost ozone in the skin layer of the bubble is quick.

The resonance hybrid structure of the ozone molecule has an obtuse angle of 116° 45"±35" and an oxygen bond length of 1.27 Å (about 0.13 nm). Trambarolo, et al., (1953) explained that the band length was intermediate between the double bong length in $O_2$ (1.21 Å) and the single bond length in hydrogen peroxide $H_2O_2$ (1.47 Å). The resonance hybrid can be thought of orienting with the negative (−) charge outwards and the positive charge inwards with linkage occurring similar to Kekule' structure of carbon by alternating resonance forms among the aligned bonding electrons. This structure of the ozone changes surface tension with water to produce extremely fine micro to nanobubbles unable to be formed with air (nitrogen/oxygen gas) alone.

The surface properties of the ball structure promote the formation of a reactive surface equivalent to hydroxyl radicals or found with thermal decomposition of ozone in collapsing cavitation bubbles of sonolytic systems. The reactivity with organic contaminants such as alkanes or 1,4 Dioxane may approach or exceed the reactivity of ozone and peroxide addition, known to produce hydroxyl radicals.

The basis for this discovery includes observed changes in surface tension, allowing smaller and smaller bubbles with increasing ozone concentration. In addition, the equivalent reactivity of the nano-micro bubbles with that of hydroxyl radical formers is greater. For example, the reactivity is unquenched with carbonate addition where hydroxyl radical reactions are quickly quenched. In addition, the ozone has an increased capacity to react with ether-like compounds such as MTBE and 1,4 Dioxane compared to what would be expected.

For example, Mitani, et al., (2001) determined in a laboratory study that if $O_3$ alone were used to remediate MTBE, then increased residence time, temperature, or $O_3$ concentration was necessary to completely oxidize MTBE to carbon dioxide. Generally, it is assumed that the initial OH. attack on MTBE by H. abstraction occurs at either methoxy group or any of the three methyl groups. The O—H bond energy is higher than that of the C—H bond of an organic compound, resulting in OH. indiscriminately abstracting hydrogen from organic compounds (Mitani, et al., 2001).

The direct bubbling of ozone from the microporous diffuser 50 (FIGS. 3, 4), where a liquid is forced through simultaneously with ozone gas or the diffuser 130 (FIG. 7) produces stable submicron-sized bubbles. The mean size of the bubbles can be checked by measuring the rise time of an aerosol-like cloud of such bubbles in a water column.

The unique spherical formation would explain a certain amount of previously unexplainable unique reactivities (with alkane fractions, for example). The reactivity of the microfine ozone bubbles with linear and branched alkanes would be a possible explanation for such low ratios of molar reactivities.

The size of bubbles would run from twenty nanometers (nm) or smaller up to about 20 microns (20,000 nm) in size. At 20 microns, the ozone concentration would be in a range of about 1% up to a maximum of 20%, whereas at the smaller size bubbles can be less, e.g., from 1% to 20% at the higher end to less than 1% because of higher surface area. Another range would be twenty nanometers (nm) or smaller up to about 1 micron in size with 1 to 10% ozone concentration. Normally, a 20 micron sized porosity microporous diffuser will produce bubbles of about 50 microns in diameter and thus smaller porosity microporous diffusers would be used or the arrangements discussed below to produce the smaller bubbles.

Possibly the entire surface area of the bubbles need not be occupied completely with the ozone molecules in order to start observing this effect. At as little as 10% (85% oxygen, balance nitrogen) of the surface area of the bubbles need be covered by ozone in order for the effect to start occurring.

The oxygen atoms in the ozone molecule have a negative charge which allows the oxygen atoms to break into smaller bubbles in water by changing surface tension. The ozone undergoes a structural change by orienting the negative and positive charges. The ozone structures have resonance structure and the ozone in the form of a gas with water molecules, could preferentially take an orientation that places the polar bonded oxygen atoms towards the water and the central oxygen atoms towards the middle of the bubbles, with the interior of the bubbles filled with ozone and air gases.

Certain advantages may be provided from this type of structure with respect to treating organic contaminants.

Because of the resonant structure of ozone, this structure appears to be inherent more reactivity than is normally associated with dissolved molecular ozone. Conventionally mixing hydrogen peroxide with ozone is thought to produce hydroxyl radicals and a concomitant increase in oxidative potential. When formed in water, however, the reactivity of hydrogen peroxide and ozone with certain materials appears to be far superior to that of normal hydroxyl radical formation. This can be particularly event with ether-like compounds and with simple carbon lineages like the octanes and hexanes.

The level of reactivity cannot be explained simply by increases in the surface to volume ratio that would occur when ozone is placed in smaller and smaller structures. The reactivity that occurs appears to be a heightened reactivity where the ozone itself is competing with ozone plus peroxide mixtures, which are normally thought to create the hydroxyl radical which has usually at least two orders of magnitude faster reactivity than dissolved molecular ozone. It is entirely possible that through the reinforcement of the resonation of the molecules of the oxygen that the way the ozone is arranged the ozone can direct more efficient reaction upon contact than individual tri-molecular ozone. Thus, less moles of ozone are need to produce a reaction with a particular compound. This form of ozone has a reactive-like surface structure.

As the bubbles get finer and finer it is difficult to measure their rate of rise because they go into motion can are bounced around by the water molecules. It is possible that bubbles that are too small might become unstable because the total number of linkages is not stable enough.

Pharmaceutical compounds are a particular good target for this enhanced reactive ozone, because pharmaceutical compounds are difficult compounds to decompose.

Figure 10:
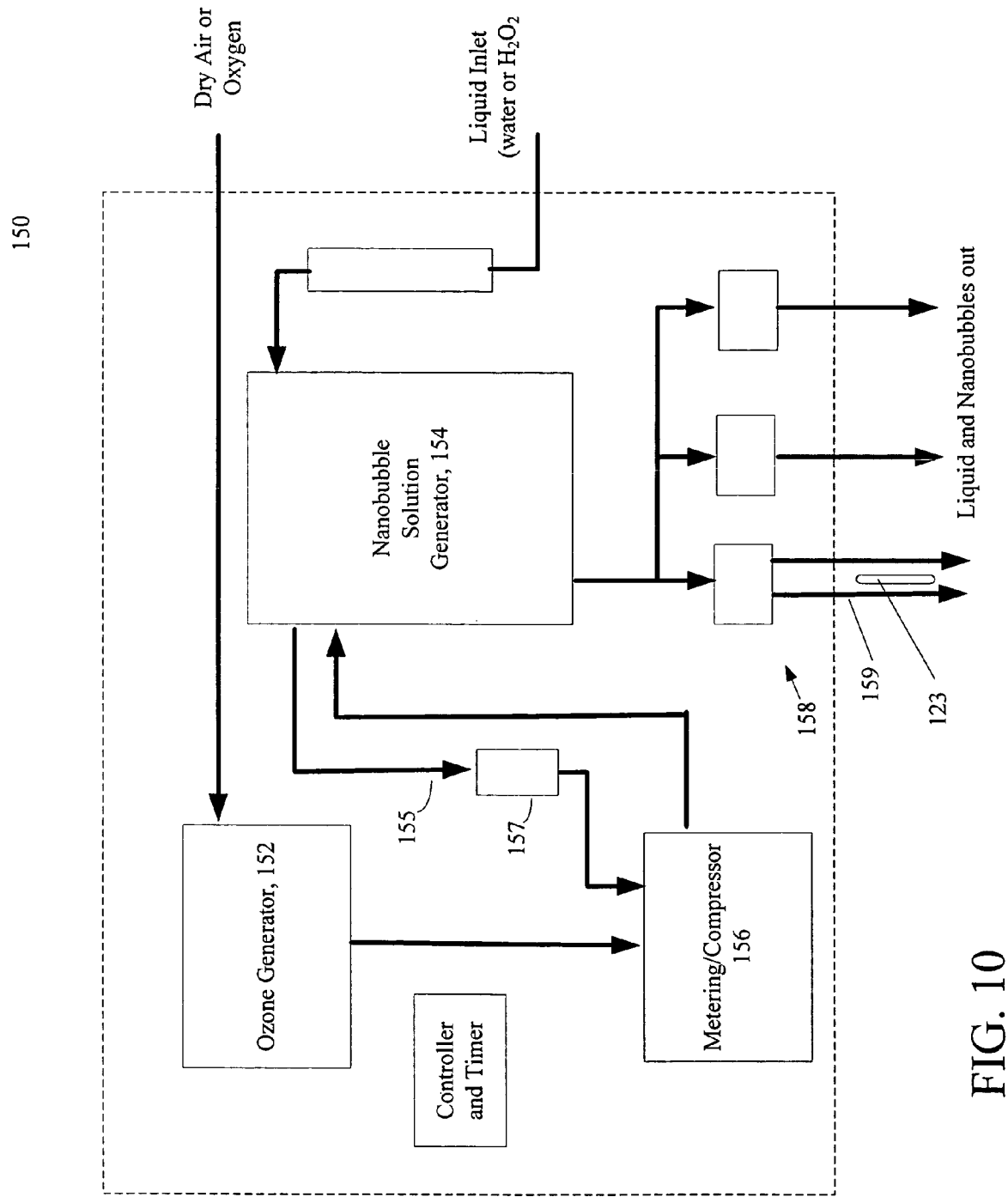
FIG. 10 is a schematic of a nanobubble field generator.

Referring to FIG. 10, a nanobubble generator 150 that can be deployed in field operations is shown. The nanobubble generator 150 includes an ozone generator 152 fed via, e.g., dry air or oxygen, a nanobubble solution generator 154 fed liquid, e.g., water or hydrogen peroxide and ozone/air or ozone/oxygen from a compressor 156. Liquid is output from the nanobubble solution generator 154 and includes a cloud of nanobubbles, and is delivered to a bank of solenoid controlled valves 158 to feed tubes 159 that can be disposed in the contact tanks (FIG. 6A or wells). The feed tubes 159 can have acoustic or sonic probes 123 disposed in the tips, as shown. A controller/timer 153 controls the compressor and solenoid control valves. A excess gas line 155 is connected via a check valve 157 between nanobubble solution generator 154 and the line from the ozone generator to bleed off excess air from the nanobubble solution generator 154.

A number of embodiments of the invention have been described. Nevertheless, it will be understood that various modifications may be made without departing from the spirit and scope of the invention.

What is claimed is:

1. A method comprises:
introducing ozone through a diffuser disposed in water, the diffuser having microporous media;
forming an outflow from the diffuser of an aqueous solution consisting essentially of the water and suspended, homogenized bubbles in the water, the bubbles shearing off of exterior walls of the diffuser by flow of water around the walls, with the diffuser having microporous media with a submicron radius entrapping within the bubbles gaseous ozone molecules, with the bubbles having an initial ozone gas concentration in the bubbles in a range of 1% to 20% ozone having bubble interfaces between water and gas in the bubbles with the ozone molecules at the interface within the bubbles aligned to orientate oxygen atoms at ends of the ozone molecules outwards towards the interface to provide a net negative charge outwards towards the interface of the bubbles and a net positive charge from central atoms of the ozone molecules at the interface within the bubbles inwards towards the interior of the bubbles; and
introducing the aqueous solution of the water and suspended, homogenized bubbles into a treatment target.

2. The method of claim 1 wherein the ozone in the bubbles is in a concentration of 5% to 20% with the balance comprising oxygen and nitrogen.

3. The method of claim 1 wherein linkage of the ozone occurs between ozone molecules by alternating resonance forms among aligned bonding electrons within the bubbles.

4. The method of claim 1 wherein forming the bubbles further comprises:
introducing oxygen and nitrogen with the ozone, into a continuous liquid stream with the ozone being in a concentration from 5 to 20% with the balance comprising oxygen and nitrogen in bubbles formed in the continuous liquid stream.

5. The method of claim 1 wherein the bubbles have an initial diameter of from about 20 nanometers to about 1 micron.

6. The method of claim 1 wherein the bubbles have an initial diameter of less than 0.1 microns.

7. The method of claim 1 wherein the bubbles have an initial diameter less than 0.01 microns.

8. The method of claim 1 wherein introducing further comprises
introducing the ozone into a wet soil formation to form the bubbles.

9. The method of claim 1 further comprising:
introducing a hydroperoxide as a coating on the bubbles.

10. The method of claim 9 wherein the hydroperoxide is hydrogen peroxide.

11. The method of claim 1 wherein forming further comprises
introducing oxygen and nitrogen and the ozone, into the water, with the ozone from 1 to 20% concentration with the balance nitrogen and oxygen in the bubbles with the bubbles having a diameter of less than 0.1 microns.

12. The method of claim 1 further comprising:
operating an ozone generator to produce the ozone from an enriched gas stream comprising air and added oxygen to produce from the ozone generator the ozone at a concentration of at least 1% ozone.

13. A method comprises:
operating an ozone generator to produce ozone from an enriched gas stream comprising air and added oxygen to produce from the ozone generator ozone in a range of at least 5% up to about 20% ozone;
introducing the ozone from the ozone generator through a diffuser having microporous media, the diffuser disposed in water that does not include added electrolytes;
forming an outflow from the diffuser of a solution consisting essentially of water having suspended, homogenized bubbles in the water, the bubbles shearing off of exterior walls of the diffuser and having a submicron radius, the bubbles entrapping a high concentration of ozone gas, with ozone concentration in the bubbles being in a range of 5% to 20% ozone with ozone molecules at interfaces of the bubbles orienting oxygen atoms at ends of the ozone molecules outwards towards the interface to provide a net negative charge outwards towards interfaces of the bubbles and a net positive charge from central atoms of the ozone molecules inwards towards the interior of the bubbles; and
introducing the aqueous solution consisting essentially of the suspended, homogenized bubbles and water into a treatment target.

14. The method of claim 13 wherein the ozone is in the concentration of 5% to 20% and the balance of gas in the bubbles comprising oxygen and nitrogen.

15. The method of claim 14 wherein linkage of the ozone occurs between ozone molecules by alternating resonance forms among aligned bonding electrons within the bubbles.

* * * * *